United States Patent
Legg et al.

(10) Patent No.: US 11,838,816 B2
(45) Date of Patent: Dec. 5, 2023

(54) COMMUNICATION WITH VEHICLE BASED NODE

(71) Applicant: Blu Wireless Technology Limited, Bristol (GB)

(72) Inventors: Peter Jonathon Legg, Bristol (GB); James Pascoe, Bristol (GB); Stuart Ryan, Bristol (GB); David Purle, Bristol (GB)

(73) Assignee: Blu Wireless Technology Limited, Bristol (GB)

( * ) Notice: Subject to any disclaimer, the term of this patent is extended or adjusted under 35 U.S.C. 154(b) by 278 days.

(21) Appl. No.: 17/120,848

(22) Filed: Dec. 14, 2020

(65) Prior Publication Data
US 2021/0195486 A1  Jun. 24, 2021

(30) Foreign Application Priority Data
Dec. 19, 2019 (GB) ..................... 1918925

(51) Int. Cl.
*H04W 36/08* (2009.01)
*H04B 7/06* (2006.01)
(Continued)

(52) U.S. Cl.
CPC .......... *H04W 36/08* (2013.01); *H04B 7/0617* (2013.01); *H04L 45/24* (2013.01); *H04W 4/40* (2018.02)

(58) Field of Classification Search
CPC ........ H04W 36/08; H04W 4/40; H04L 45/24; H04B 7/0617
See application file for complete search history.

(56) References Cited

U.S. PATENT DOCUMENTS

2014/0146749 A1* 5/2014 Barker ................ H04W 40/026
370/328
2016/0366049 A1* 12/2016 Achouri .................. H04L 69/16
(Continued)

FOREIGN PATENT DOCUMENTS

| EP | 1718095 A1 | 11/2006 |
|---|---|---|
| WO | 2019/120479 A1 | 6/2019 |
| WO | 2019120479 A1 | 6/2019 |

OTHER PUBLICATIONS

Kalokidou Vaia et al: 11 Performance Evaluation of mnWave in 5G Train Co11111uni cati ons11, 2018 IEEE 29th Annual International Symposium on Personal, Indoor and Mobile Radio Communications (PIMRC), IEEE, Sep. 9, 2018 (Sep. 9, 2018), pp. 391-395, XP033479661, DOI: 10.1109/PIMRC.2018.8581018 * paragraphs [Abstract]—[0001] *.

(Continued)

*Primary Examiner* — Kent Krueger
(74) *Attorney, Agent, or Firm* — Optimus Patents US, LLC

(57) ABSTRACT

A communication system comprises access points (203, 205) communicating via directional beams and a first and second wireless modem (111, 701) for establishing a first and respectively second mm wave radio communication links to access points (203, 205). The first and second wireless modems (111, 701) are located on a vehicle (103) and employ electronically steerable beamforming directional antennas having a first main beams for establishing the radio communication links. A common network element (705) supports communication over both links and a connection control circuit (1001) switches between the links while providing a single wired connection point. A multipath controller (713) communicates with a complementary multipath controller of the fixed network over a plurality of paths with the multipath controller (713) having a first wired (Continued)

port for a first path of the plurality of paths connected to the first single wired connection point.

21 Claims, 15 Drawing Sheets

(51) Int. Cl.
*H04L 45/24* (2022.01)
*H04W 4/40* (2018.01)

(56) References Cited

U.S. PATENT DOCUMENTS

| | | |
|---|---|---|
| 2017/0245192 A1* | 8/2017 | Sadri ................ H04W 36/0009 |
| 2017/0367088 A1* | 12/2017 | Ruan .................... H04W 24/02 |
| 2018/0332516 A1* | 11/2018 | Oak ...................... H04W 36/08 |
| 2019/0281517 A1* | 9/2019 | Oak ...................... H04W 36/08 |
| 2020/0154279 A1* | 5/2020 | Bro ..................... H04W 84/005 |
| 2022/0210808 A1* | 6/2022 | Rama Chandran ......................... H04W 72/1273 |

OTHER PUBLICATIONS

Kalokidou Vaia et al: "Performance Evaluation of mmWave in 5G Train Communications", 2018 IEEE 29th Annual International Symposium on Personal, Indoor and Mobile Radio Communications (PIMRC), IEEE, Sep. 9, 2018 (Sep. 9, 2018), pp. 391-395, XP033479661, DOI: 10.1109/PIMRC.2018.8581018 [retrieved on Dec. 18, 2018].

* cited by examiner

COMMUNICATION WITH VEHICLE BASED NODE

FIELD OF THE INVENTION

The invention relates to a communication system supporting communication with a vehicle-based node and an apparatus and method therefor, and in particular, but not exclusively, to wireless communication for a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example, in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in already used frequency ranges. This in particular applies to both cellular and Wi-Fi based wireless communication systems. It is therefore desirable to exploit less used frequency bands and there is substantial interest in providing high capacity support of fast moving vehicles using millimetre-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of air interface in mm wave communication and with potentially fast-moving vehicles is a difficult challenge. This challenge is further exacerbated by the desire to provide this function in communication systems that are compatible with many existing network techniques and principles, such as Internet Protocol based routing, existing network-based mobility functions etc. A particular challenge is how to handle handovers in terms of updating the network operation and data routing as air interface links change.

A particular challenge is that of how to improve or optimize performance using existing equipment with existing limitations and constraints. It is particularly desirable and challenging to introduce new features and ways of operating to existing communication networks without requiring substantial changes, disruption, and replacement of existing functionality.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization, improved performance, improved network, increased backwards compatibility, improved and/or facilitated data routing updating and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to a first aspect of the invention, there is provided a communication system for supporting communication between an end node of a vehicle and a remote correspondent node via a fixed network, the communication system comprising: a first wireless modem for establishing a first link being a first mm wave radio communication link to a first access point of a plurality of wireless access points of the fixed network, each wireless access point having a directional antenna arrangement for mm wave radio communication using directional beams, the first link supporting a data session between the end node and the remote correspondent node, the first wireless modem being located on the vehicle and employing a first electronically steerable beamforming directional antenna having a first main beam for establishing the first mm wave radio communication link; a second wireless modem for establishing a second link being second mm wave radio communication link to a second access point further supporting the data session, the second wireless modem being located on the vehicle and employing a second electronically steerable beamforming directional antenna having a second main beam for establishing the second mm wave radio communication link; a first common network element located on the vehicle and arranged to providing a first single wired connection point for the data session, the first single wired connection point being common for the first link and the second link and the first common network element being arranged to dynamically switch between the first link and the second link for the data session; and a multipath controller located on the vehicle and arranged to communicate with a complementary multipath controller of the fixed network over a plurality of paths, the multipath controller having a first wired port for a first path of the plurality of paths connected to the first single wired connection point.

The invention may provide improved and/or facilitated operation and/or improved performance for a beamform based mm wave radio communication system supporting (potentially fast) moving vehicles. The approach may in particular provide efficient and reliable communication.

The approach may provide improved performance and/or improved backwards compatibility. It may for example in many embodiments and applications allow improved air interface diversity while allowing reuse of existing equipment and network arrangements. The approach may allow an efficient, high performance, and quick adaptation of the network to changes in radio conditions as the vehicle moves. This adaptation functionality may often be achieved with minimal impact on the remaining network.

The use of beams from the directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The end node and/or wireless modems may be in/on/attached to/move with etc. the vehicle, and may be part of a mobile network that moves with the vehicle.

The first mm wave radio communication link is formed using a first directional beam of the directional antenna arrangement of the first access point. The second mm wave radio communication link is formed using a second directional beam of the directional antenna arrangement of the first access point. The second directional beam of the directional antenna arrangement may in some situations be the same beam as the first directional beam of the directional antenna arrangement.

In many embodiments, the first common network element may be arranged to switch between the first and second mm wave radio communication link by controlling an external data switch function.

The first common network element may be arranged select between the first and second mm wave radio communication link. The switching between the first and second mm wave radio communication link may follow a selection of the first or second mm wave radio communication link. The first common network element may be arranged to switch to a mm wave radio communication link that is selected.

A switch and/or selection between two mm wave radio communication links, such as between the first and second mm wave radio communication link, is not necessarily limited to being a switch and/or selection between only those two mm wave radio communication links but rather there may be other candidate mm wave radio communication links for the selection/switch. Thus, a selection/switch between more than two mm wave radio communication links is also inherently a selection/switch between those two mm wave radio communication links. In some embodiments, the first common network element may be arranged to select/switch between more than two mm wave radio communication links of which the first and second mm wave radio communication links are included. Such a selection/switching inherently also includes/is a selection/switch between the first and second mm wave radio communication links.

A complementary multipath controller is an interworking/cooperating multipath controller. The multipath controller and complementary multipath controller may form a single path for the data session for the end node and correspondent node while implementing multiple parallel paths for the data session between the multipath controller and the complementary multipath controller.

According to an optional feature of the invention, the communication system further comprises: a third wireless modem for establishing a third link being a third mm wave radio communication link to a third access point supporting a data session between the end node and the remote correspondent node, the third wireless modem being located on the vehicle and employing a third electronically steerable beamforming directional antenna having a third main beam for establishing the third mm wave radio communication link; a fourth wireless modem for establishing a fourth link being a fourth mm wave radio communication link to a fourth access point further supporting the data session, the fourth wireless modem being located on the vehicle and employing a fourth electronically steerable beamforming directional antenna having a fourth main beam for establishing the fourth mm wave radio communication link; a second common network element for providing a second single wired connection point for the data session, the second single connection point being common for the third link and the fourth link and the second common network element being arranged to dynamically switch between the third link and the fourth link for the data session; and the multipath controller has a second wired port for a second path of the plurality of paths connected to the second single wired connection point.

The second common network element may be arranged select between the third and fourth mm wave radio communication link. The switching between the third and fourth mm wave radio communication link may follow a selection of third and fourth mm wave radio communication link. The second common network element may be arranged to switch to a mm wave radio communication link that is selected.

In some embodiments, the second common network element may be arranged to select/switch between more than two mm wave radio communication links of which the third and fourth mm wave radio communication links are included. Such a selection/switching inherently also includes/is a selection/switch between third first and fourth mm wave radio communication links.

According to an optional feature of the invention, the first common network element comprises a first selector for selecting between the first link and the second link in response to radio link condition indications for the first link and the second link.

This may allow an efficient approach for adapting the operation of the network to air interface variations. The second access point may be arranged to broadcast or unicast the routing update message.

The switching between the first and second mm wave radio communication links may follow the selection of the first and second mm wave radio communication link. The first common network element may be arranged to switch to the mm wave radio communication link that is selected.

According to an optional feature of the invention, the first selector is arranged to select between the first link and the second link independently of characteristics of the third link and the fourth link.

According to an optional feature of the invention, the second common network element comprises a second selector for selecting between the third link and the fourth link in response to radio link condition indications for the third link and the fourth link.

The switching between the third and fourth mm wave radio communication links may follow the selection of the third and fourth mm wave radio communication link. The second common network element may be arranged to switch to the mm wave radio communication link that is selected.

According to an optional feature of the invention, the second common network element is arranged to transmit a radio condition message to the first common network element, the radio condition message comprising a first radio condition indication for at least one of the third link and the fourth link; and the first selector is arranged to select between the first link and the second link in response to the first radio condition indication.

According to an optional feature of the invention, the first selector is arranged to select between the third link and the fourth link in response to the first radio condition indication and a second radio condition indication for at least one of the first link and the second link.

According to an optional feature of the invention, the first selector is arranged to determine a combined link capacity indication for a plurality of combinations of a first candidate link from a set comprising the first link and the second link and a second candidate link from a set comprising the third link and the fourth link; to select a first combination of the plurality of combinations for which the combined link capacity meets a first criterion, and to select the first candidate link of the first combination for the first single wired connection point and the second candidate link of the first combination for the second single wired connection point.

The approach may provide particularly advantageous performance by allowing a joint selection/consideration/optimization.

The first criterion may be any suitable criterion. In many embodiments, the first criterion may bias the selection towards a combination having a higher combined link quality. A higher combined link capacity makes selection of the combination more likely.

In some embodiments, the first criterion is dependent on whether the candidate links of the combination are to different access points or a same access point.

The interface of the common network element may be a port or address to which the end node is arranged to forward data for the correspondent node. The interface may specifically be a single wired connection point for the data session, the first single connection point being common for the first mm wave radio communication link and the second mm wave radio communication link.

In some embodiments, the criterion is dependent on a number of switches of links are required to switch to the combination from a currently employed combination.

According to an optional feature of the invention, the second common network element is arranged to transmit the radio link condition indications for the third link and the fourth link to the first common network element, the first common network element is arranged to transmit the radio link condition indications for the first link and the second link to the second common network element, the first selector is arranged to select between the first link and the second link and between the third link and the fourth link in response to the radio condition indications for the first link and the second link and the radio condition indications for the third link and the fourth link, the second selector is arranged to select between the first link and the second link and between the third link and the fourth link in response to the radio condition indications for the first link and the second link and the radio condition indications for the third link and the fourth link, and the first selector and the second selector uses a same selection criterion for selection.

The first selector and the second selector may use the same combined selection criterion for selection between both the first and second links and the third and fourth links. The first selector and the second selector may operate a same selection algorithm. The first selector and the second selector may use the same selection criterion such that for the same input values (specifically radio link conditions), the same links are selected by the first selector and the second selector.

According to an optional feature of the invention, the first common network element is arranged to transmit a radio condition message comprising at least one radio link condition indication for the first link and the second link to the second common network element in response to a change in radio link conditions for at least one of the first link and the second link meeting a criterion.

The criterion may be a selection criterion, and the first common network element may be arranged to transmit the radio condition message in response to the radio link conditions meeting a selection criterion for a change in selection between the first link and the second link.

In many embodiments, the second common network element is arranged to transmit a radio condition message comprising at least one radio link condition indication for the third link and the fourth link to the first common network element in response to receiving the radio condition message comprising at least one radio link condition indication for the first link and the second link.

In many embodiments, the first radio condition indication includes at least an indication of a parameter of the group of: a beacon signal strength value; an applied modulation and coding scheme; and a throughput.

According to an optional feature of the invention, the first selector is arranged to transmit a selection message to the second common network element, the selection message comprising an indication of a selected link between the first link and the second link; and the second common network element is arranged to select between the third and the fourth mm wave radio communication links in response to the indication of the selected link.

In some embodiments, the selection message comprises an indication of a timing for a change of selected mm wave radio communication link.

According to an optional feature of the invention, the second common network element is arranged to select between the third link and the fourth link in response to radio conditions for the third link and the fourth link unless overridden by a selection between the third link and the fourth link by the first common network element.

According to an optional feature of the invention, the first selector is arranged to select between the third link and the fourth link and to transmit a selection message to the second common network element, the selection message comprising an indication of a selected link between the third link and the fourth link; and the second common network element comprises a second selector arranged to select between the third link and the fourth link in response to the indication of the selected link.

In many embodiments, the communication system further comprises a circuit for estimating at least one of a throughput and a modulation and coding scheme for the first link in response to a signal strength of a transmission from the first access point when the second link is switched to the first single wired connection point; and wherein a selection between the first link and the second link is in response to the at least one of the throughput and the modulation and coding scheme.

According to an optional feature of the invention, the first selector is arranged to transmit a selected link property message to the second common network element, the selected link property message comprising an indication of link property of a currently selected link between the first link and the second link; and the second common network element is arranged to select between the third link and the fourth link in response to the indication of the link property.

In some embodiments, the link property comprises an indication of a selected access point being an access point supporting the currently selected link.

In some embodiments, the second common network element is arranged to bias selection away from a link being supported by the access point supporting the currently selected link.

According to another aspect of the invention, there is provided a method of operation for a communication system supporting communication between an end node of a vehicle and a remote correspondent node via a fixed network, the method comprising: a first wireless modem establishing a first link being a first mm wave radio communication link to a first access point of a plurality of wireless access points of the fixed network, each wireless access point having a directional antenna arrangement for mm wave radio communication using directional beams, the first link supporting a data session between the end node and the remote correspondent node, the first wireless modem being located on the vehicle and employing a first electronically steerable beamforming directional antenna having a first main beam for establishing the first mm wave radio communication link; a second wireless modem establishing a second link being second mm wave radio communication link to a second access point further supporting the data session, the second wireless modem being located on the vehicle and employing a second electronically steerable beamforming directional antenna having a second main beam for establishing the second mm wave radio communication link; a first common network element located on the vehicle providing a first single wired connection point for the data session, the first single wired connection point being common for the first link and the second link and the first common network element dynamically switching between the first link and the second link for the data session; and a multipath controller located on the vehicle communicating with a complementary multipath controller of the fixed network over a plurality of paths, the multipath controller having a first wired port for a first path of the plurality of paths connected to the first single wired connection point.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
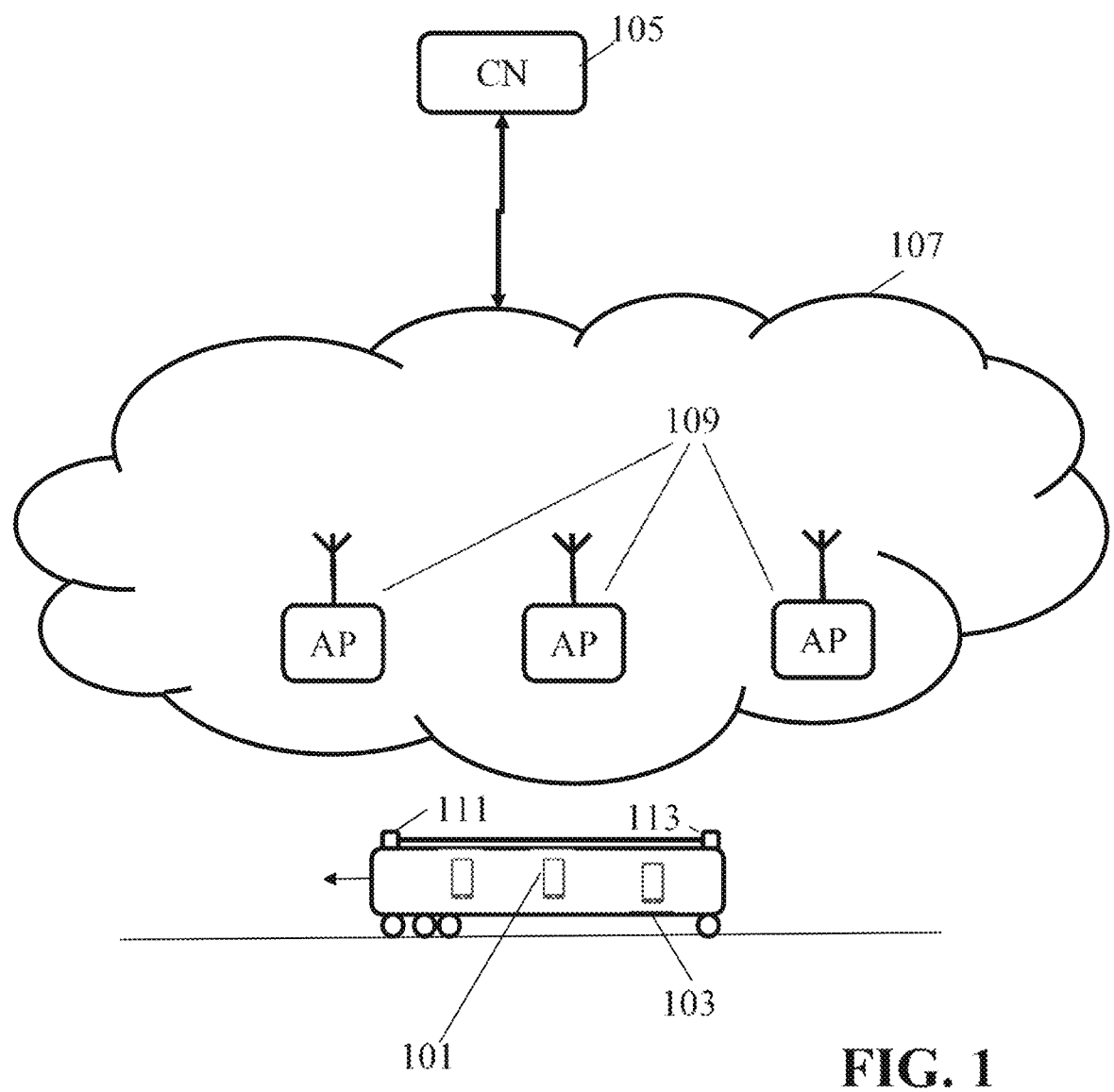
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet.

The coupling of the fixed network 107 to nodes on the train 103 is supported by wireless radio communication links. For this purpose, the fixed network 107 comprises a plurality of wireless access points 109 which in the specific example may be a relatively large number of stationary access points positioned along the train tracks.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113. In the specific embodiment of using the IEEE 802.11ad wireless technology, the AP and the two modems would form a BSS (basic service set). In the specific embodiment of a 3GPP 5G NR radio technology the AP would be known as a base station (a sector of a gNB) and the modems would be known as UEs, with the three devices forming a cell. A scheduler may accordingly allocate data packets to an individual link by associating them with the appropriate MAC address.

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m-1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but is limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train. The approach will be described in more detail with reference to FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

Figure 2:
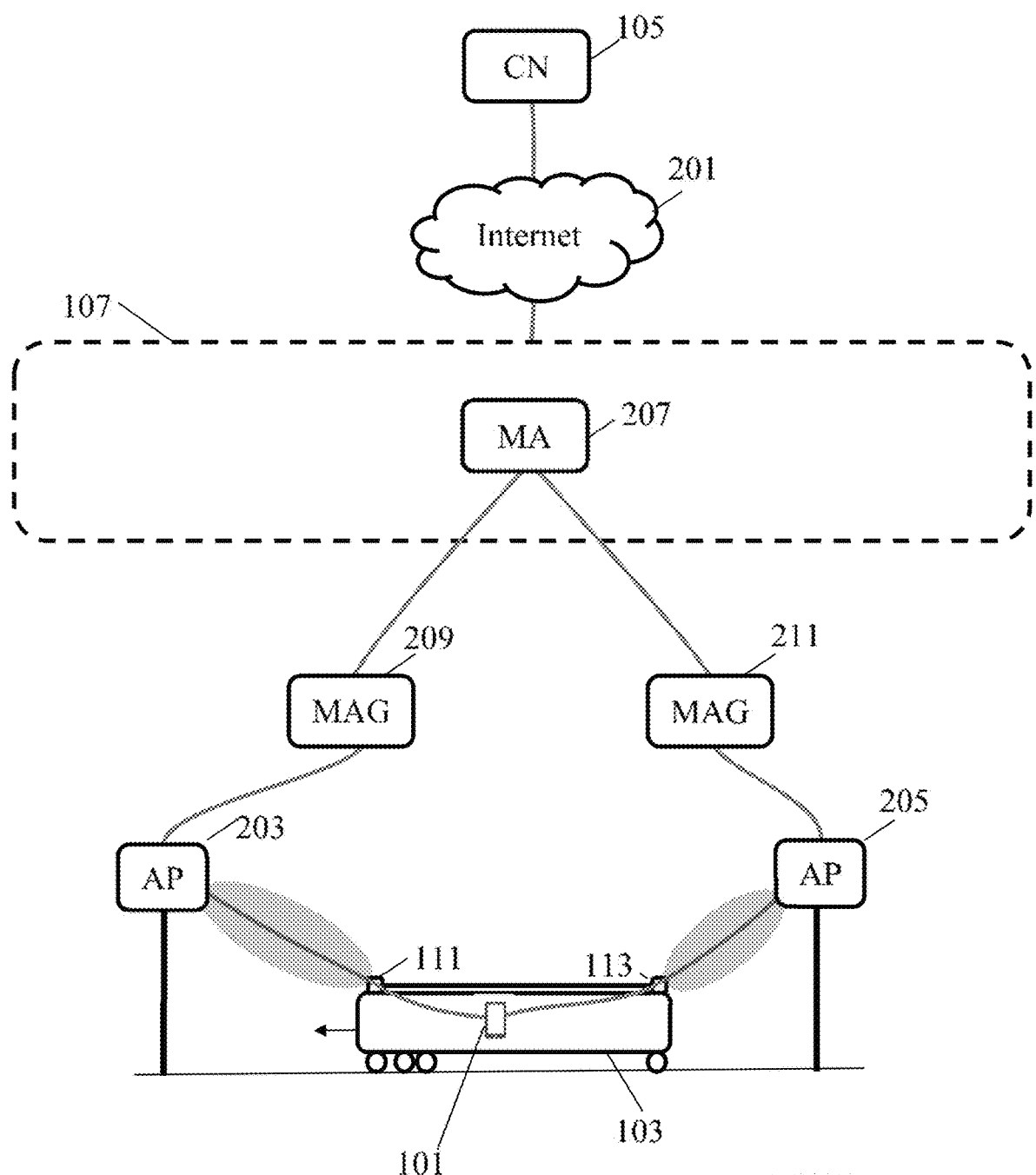
FIG. 2 illustrates an example of elements of a wireless communication system in accordance with some embodiments of the invention.

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 comprises a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205.

The mobility anchor 207 is accordingly a common mobility anchor for a plurality of the wireless modems 111, 113 of the train 103, and typically for all of the wireless modems 111, 113.

In many practical systems, some or all of the access points 109 may be substantially colocated and coupled together through network entities that allow short routing paths between them.

Figure 3:
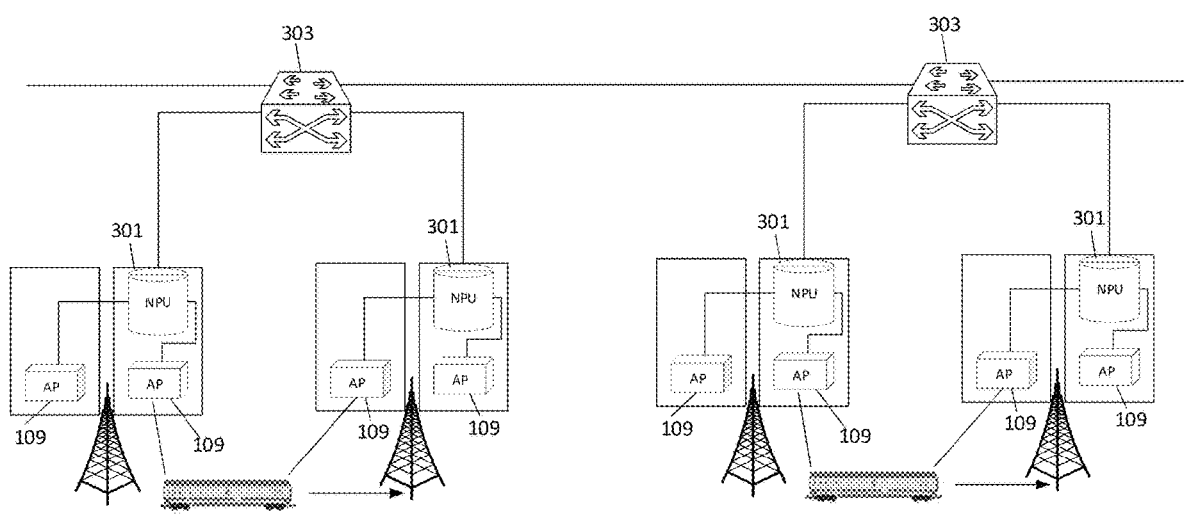
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions. Thus, the access points 109 may comprise a directional antenna arrangement which forms directional beams to support the mm wave radio communications. In some embodiments, the directional antenna arrangement may be arranged to dynamically beam form and steer beams towards wireless modems on the vehicle, i.e. dynamic beam adaptation and steering may be employed. In other embodiments, the directional antenna arrangement may form static beams that are in a given, typical predetermined direction. For example, for access points next to a train track, a static beam in the direction along the track may be formed.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109. In some embodiments, the NPU 301 may for example implement a Mobile Access Gateway (MAG) functionality in accordance with a Mobile IP approach.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. In some embodiments, the switches or routers 303 connecting the access points 109 may implement the MAG functionality.

The switches or routers 303 may further connect to the rest of the fixed networks, e.g. through interface routers/switches 305. Alternatively or additionally, MAG functionality may be implemented as part of the interface routers/switches 305.

Figure 4:
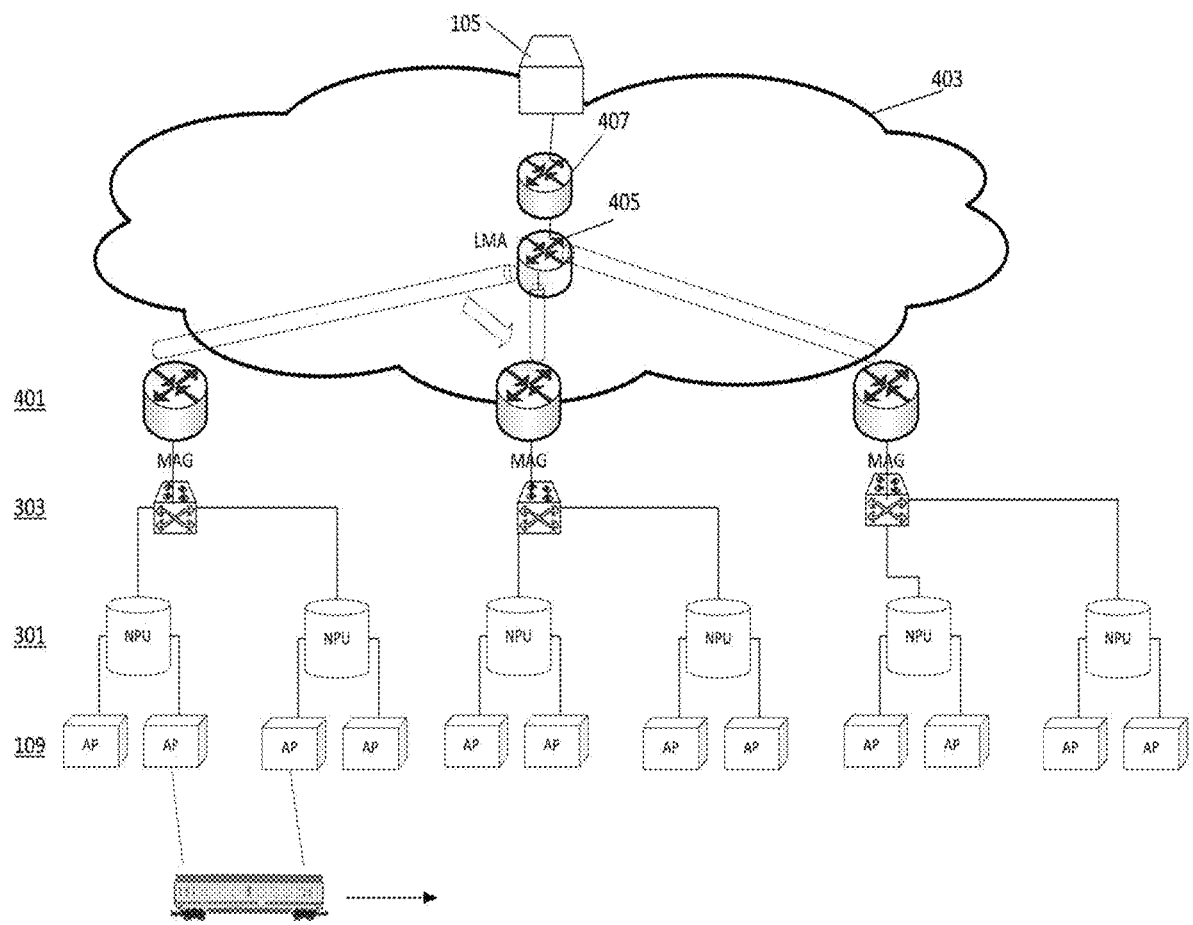
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

In such a system, different functions may be implemented in respectively the proprietary access network and the non-proprietary fixed network. For example, different mobility functions and support may be implemented.

Specifically, the mobility support may be implemented at different network layers and using different protocols. For example, intra MAG mobility may be implemented using layer 2 signaling such as L2 ARP (Data Link Layer—Address Resolution Protocol). This may provide fast and efficient handover between access points 109 under the same MAG, and specifically may allow handovers without requiring any change of routing in the core network (if the MAG is part of the access network).

In contrast, inter MAG mobility may be supported by a higher layer protocol such as for example an IP mobility protocol. Specifically, inter-MAG mobility may be supported by Proxy Mobile Internet Protocol v6 (PMIPv6). This allows the required routing changes in the core network 403 to be implemented efficiently.

Figure 5:
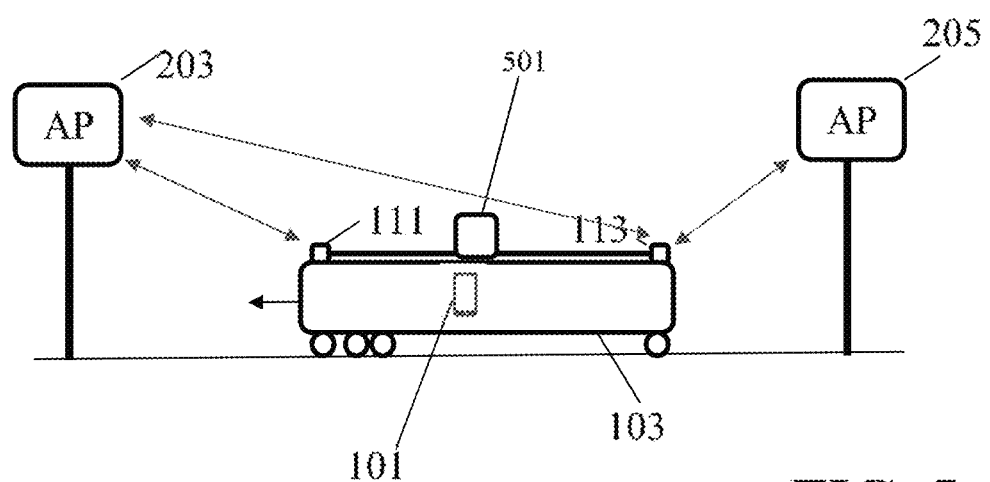
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed.

Figure 6:
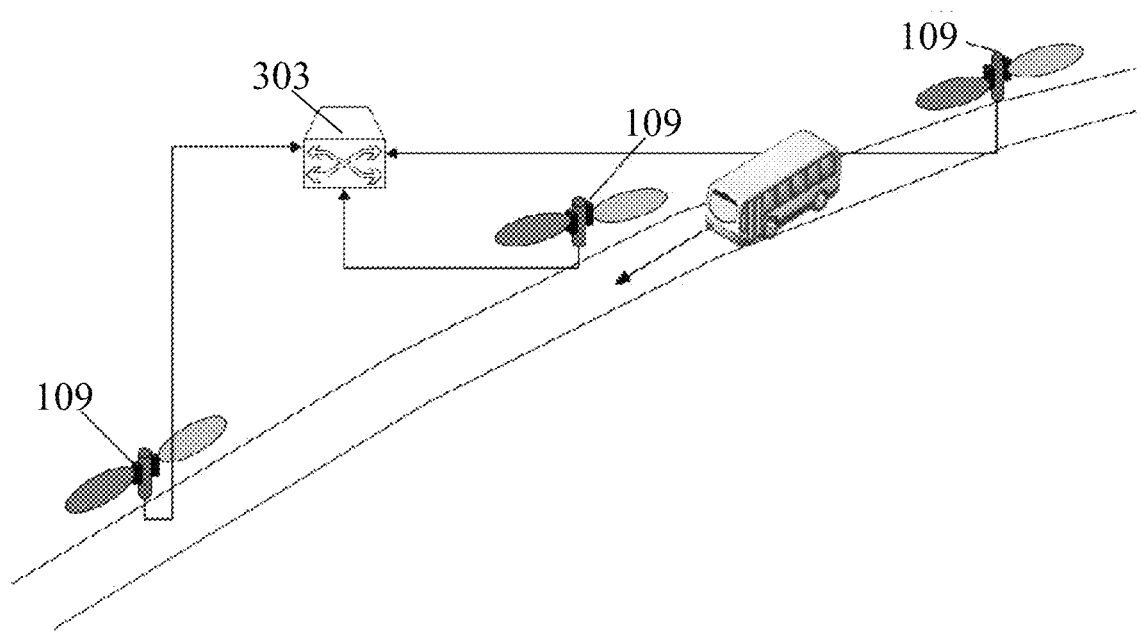
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the forwards and in the backwards direction. Similarly, rather than having a single wireless modem towards the back of the vehicle/train, there may be two wireless modems forming beams respectively in the forwards and in the backwards direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

However, for practical reasons, it may often be desirable to reduce the number of individual links. For example, a system employing two wireless modems may be upgraded to use four wireless modems. However, some of the other equipment or functionality of the network may be based on only two wireless modems being present. In some systems, sets of wireless modems may be combined to appear as a single link to (some) other networks. For example, a common network element may provide a single common connection point for all wireless modems in a set. However, in such scenarios, it is a challenge to manage/adapt/update the network to provide the correct routing of data when e.g. changes in the links occur.

Figure 7:
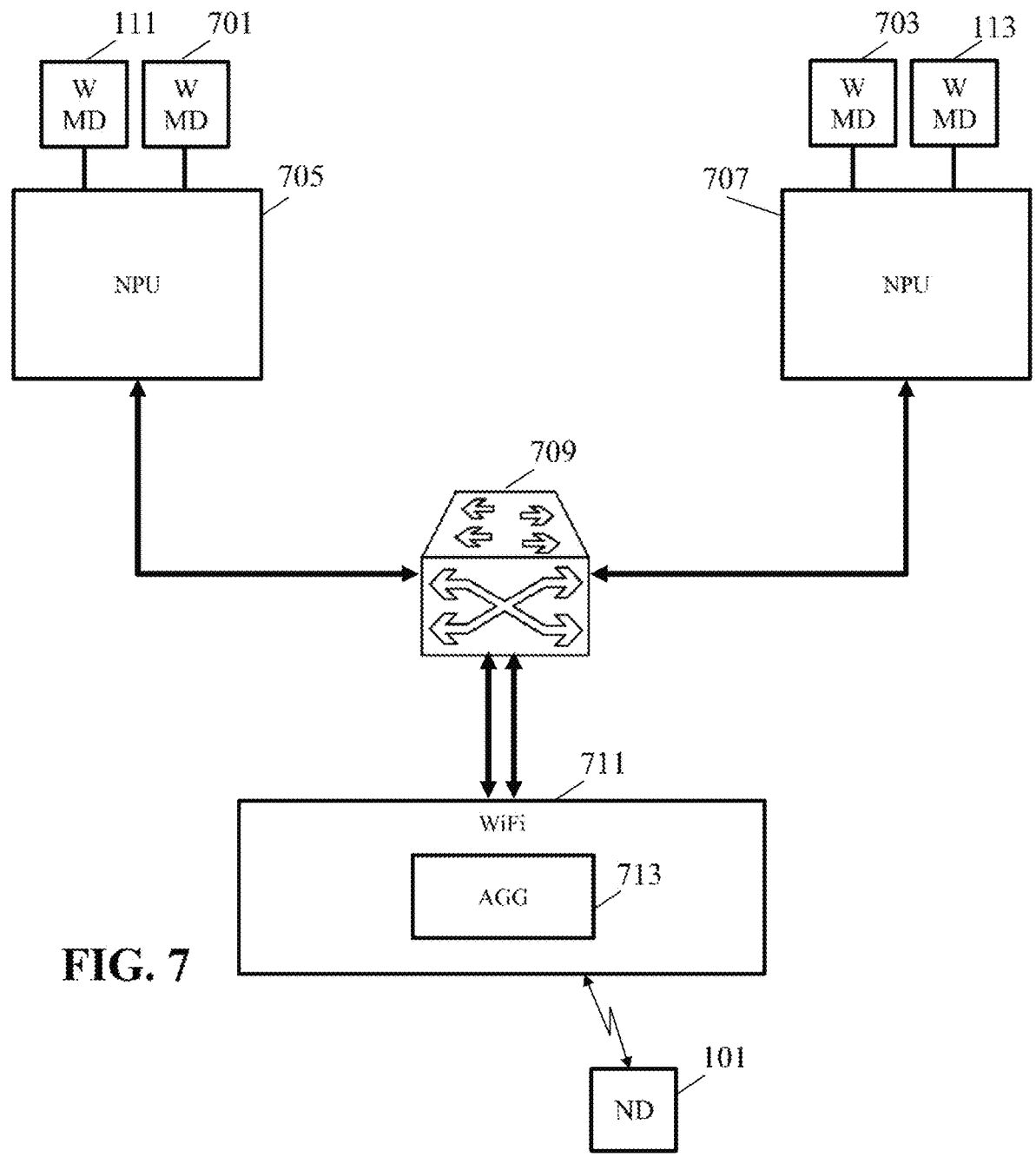
FIG. 7 illustrates an example of elements of a vehicle based network subsystem of a wireless communication system in accordance with some embodiments of the invention.

FIG. 7 illustrates an example where a moving vehicle may comprise four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a Wi-Fi subsystem 711. The NPUs 705, 707 and WiFi subsystem 711 may specifically be coupled to the switch 709 via Ethernet connections and the switch 709 may be an Ethernet switch. The WiFi subsystem 711 may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem 711 may for example be a conventional WiFi system such as an IEEE 802ac (or earlier) system. Thus, a user on a moving vehicle, such as a train, may simply access a conventional local WiFi access point to gain Internet access.

In the system of FIG. 7, the first NPU 705 is a common network element for the first pair of colocated wireless modems 111, 701 and the second NPU 707 is a common network element for the second pair of colocated wireless modems 113, 703. Thus, the first NPU 705 is a common network element 705 for first and second mm wave radio communication links and the second NPU 707 is a common network element 707 for third and fourth mm wave radio communication links.

A common network element for a plurality of wireless modems may thus be arranged to support communication between the end node and the remote node via (any) one of the wireless modems. A common network element for two or more mm wave radio communication links may be a network element through which data of data session is routed regardless of which of the mm wave radio communication links it is transmitted over.

In many embodiments, the IP address for the common network element is a common IP (gateway) address used for routing between the end node 105 and the correspondent node 105 regardless of which mm wave radio communication link is used for the communication via the common network element.

In one embodiment, the common network element can be a bridge between the wired interface to the NPU/common network element and the wireless interfaces.

In the system described, the wireless modems employ electronically steerable beamforming directional antenna that form a beam, and more specifically that form a directional pattern having a main beam that can be steered. Further, in the example two colocated wireless modems may employ directional antennas that may form a beams in different directions, such as e.g. in a forwards direction or range of directions and a backwards direction or range of directions respectively.

E.g., in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the forwards direction of the vehicle and the other being pointed in the backwards direction of movement. Similarly, the other two co-located modems 113, 703 may employ directional antennas that are also directed in opposite directions, specifically in the direction of movement and in the opposite direction (forward/backwards). This may result in two wireless modems 111, 703 having beams formed generally in the forward direction (direction of movement) and two modems 113, 701 having beams formed generally in the backward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna coefficients to direct the main beam towards the relevant access points, e.g. by applying a beam steering algorithm maximizing the received signal strength or signal to noise ratio as well known in the art. As another example, more mechanical solutions may be used. For example, horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially in the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the forwards direction may both be suitable for establishing a wireless link with an access point 109 further ahead along the route/track. Similarly, the two wireless modems having beams pointing in the backwards direction may both be suitable for establishing a wireless link with an access point 109 being further backwards along the tracks.

Figure 8:
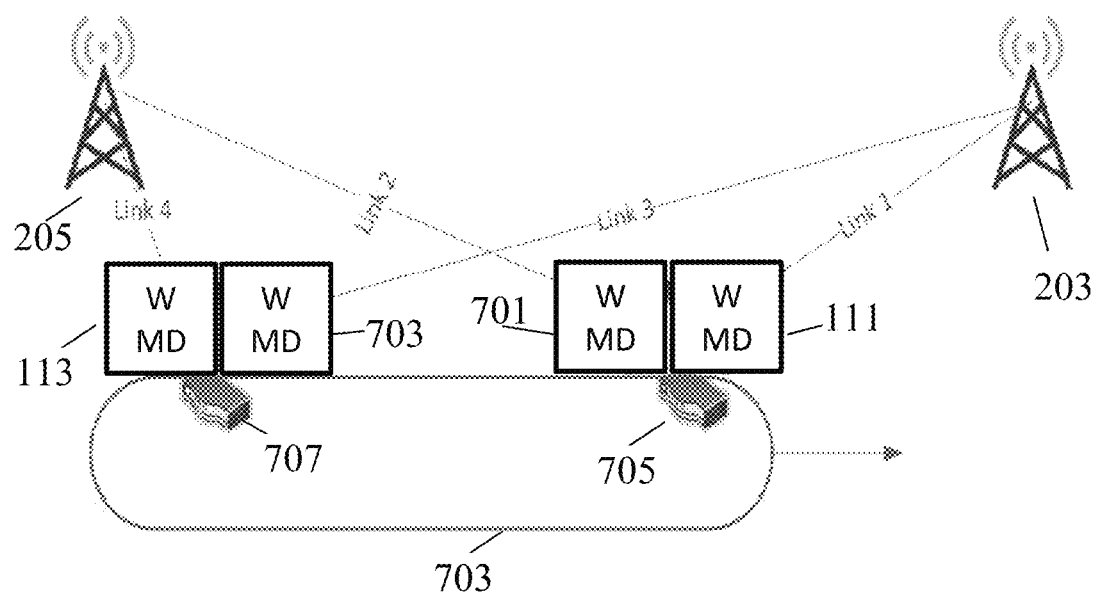
FIG. 8 illustrates an example of elements of a wireless communication system in accordance with some embodiments of the invention.
Figure 9:
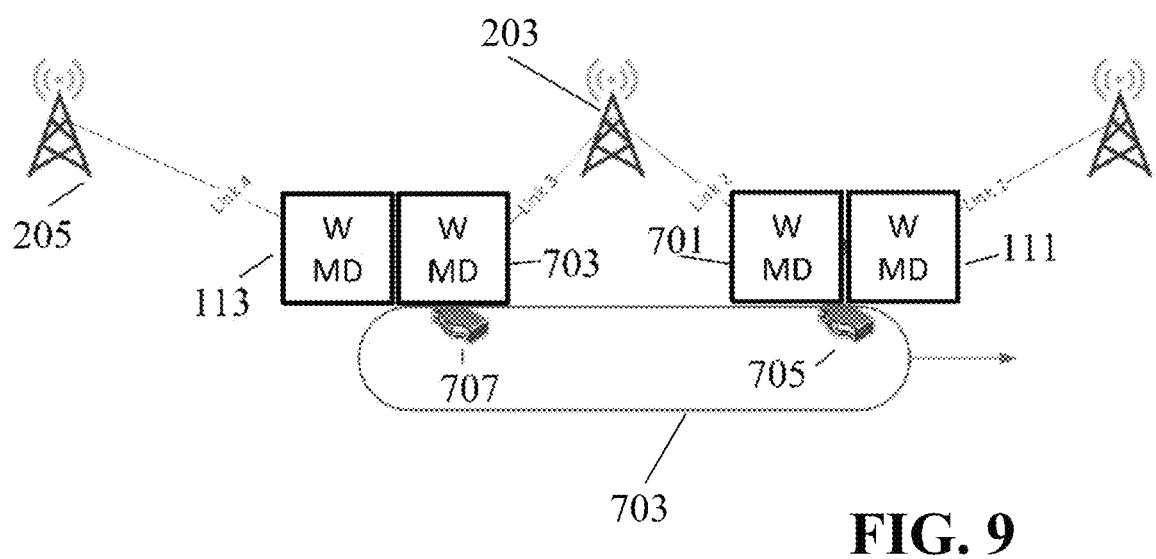
FIG. 9 illustrates an example of elements of a wireless communication system in accordance with some embodiments of the invention.

Similarly, the beam steering may be towards an access point rearwards of the vehicle/train 103 and this may indeed be simultaneous with another of the colocated wireless modems steering a beam towards a forward access point. Thus, often a situation may occur where one set of colocated wireless modems have established links with respectively a forwards and rearwards access point and thus forms beams in substantially opposite directions. At the same time, the other set of colocated wireless modems may have established links with respectively a forwards and rearwards access point and thus also form beams in substantially opposite directions. Further, one pair of non-colocated wireless modems may form beams towards the forwards access point and thus substantially in the same forwards direction, and another pair of non-colocated wireless modems may form beams towards the rearward access point and thus substantially in the same rearwards direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with four different access points.

Thus, the vehicle, such as a train or a bus, may comprise sets of wireless modems that may be reached through a common network element, and specifically via a single common connection point of the common network element. The examples of FIGS. 7, 8 and 9 employs two pairs of such modems. Typically, the modems that can be reached through a single common connection point and the common network element are substantially co-located and the modems of such a set will for brevity be referred to as co-located modems.

However, it will be appreciated that it is not essential for such modems to be co-located.

The vehicle may typically comprise a plurality of such sets of wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the forwards direction and one wireless modem facing in the backwards direction. In such scenarios, wireless modems in different sets being arranged to form beams in corresponding directions will be referred to as aligned wireless modems.

The approach may in particular allow each set of co-located wireless modems to form mm wave radio communication links to different access points and may also allow different sets of co-located wireless modems to form links to the same access point. For example, in FIGS. 7 and 8, wireless modem 111 and aligned wireless modem 703 are arranged to establish mm wave radio communication links to the same access point 203. This may provide more efficient communication over the radio air interface in many embodiments and may allow a fast and efficient adaptation to the current radio conditions. This is particularly significant for mm wave radio communication for moving vehicles as the conditions for individual links may change exceedingly quickly and substantially. The approach may provide additional air interface diversity which can increase overall throughput.

Thus, for brevity, conciseness and clarity, modems having the beams formed in substantially the same direction will be referred to as aligned wireless modems and the description will focus on a vehicle comprising a pair of aligned wireless modems having forward facing beams and a pair of aligned modems having rearward facing beams. Beams and radio communication links from different wireless modems to the same access point will also be referred to as aligned beams and aligned radio communication links. Similarly, for co-located modems, the beams and radio communication links will also be referred to as co-located beams and radio communication links.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle.

In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and backwards facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

In the described system, multiple simultaneous mm wave radio communication links may be set up with associated wireless modems and a data flow to a specific end node 101 on the vehicle may be able to use such multiple simultaneous mm wave radio communication links.

In the system, the common network elements/NPUs for the colocated sets (specifically pairs) of wireless modems are arranged to dynamically switch between the wireless modems and thus mm wave radio communication links supported by the common network elements. Specifically, the common network elements 705, 707 may be arranged to switch between wireless modems/mm wave radio communication links during a data session for the end node 105.

The switching between different mm wave radio communication links is by selecting one of the mm wave radio communication links for over the air interface communication of data of the data session. Thus, the switching is such that only one of the mm wave radio communication links is used for over the air data communication at a time. In other words, the switching between two mm wave radio communication links is such that one of the two links is selected as active and the other is selected as inactive.

The mm wave radio communication links being switched between are established mm wave radio communication links that have already been setup between the wireless modems and one or more access points. Accordingly, the mm wave radio communication links are available for communicating data of the data session. Each mm wave radio communication link is an established communication link between a wireless modem and an access point. Each mm wave radio communication link is ready for communicating data over the air interface. However, the switching is such that only one of the established mm wave radio communication links is used at a time, and the switching selects one out of the established mm wave radio communication links as an active link for communication of data of the data session. A radio link that is established corresponds to an association existing between the modem and an access point.

Furthermore, typically the common network elements 705, 707 may provide a common connection point that does not depend on which wireless modem/mm wave radio communication link is currently selected. Indeed, switching between the different mm wave radio communication links may be performed without requiring any changes in routing etc. to be made on the vehicle side of the common network elements 705, 707, and indeed the switching of mm wave radio communication links may be invisible to the routing in the vehicle network.

Figure 10:
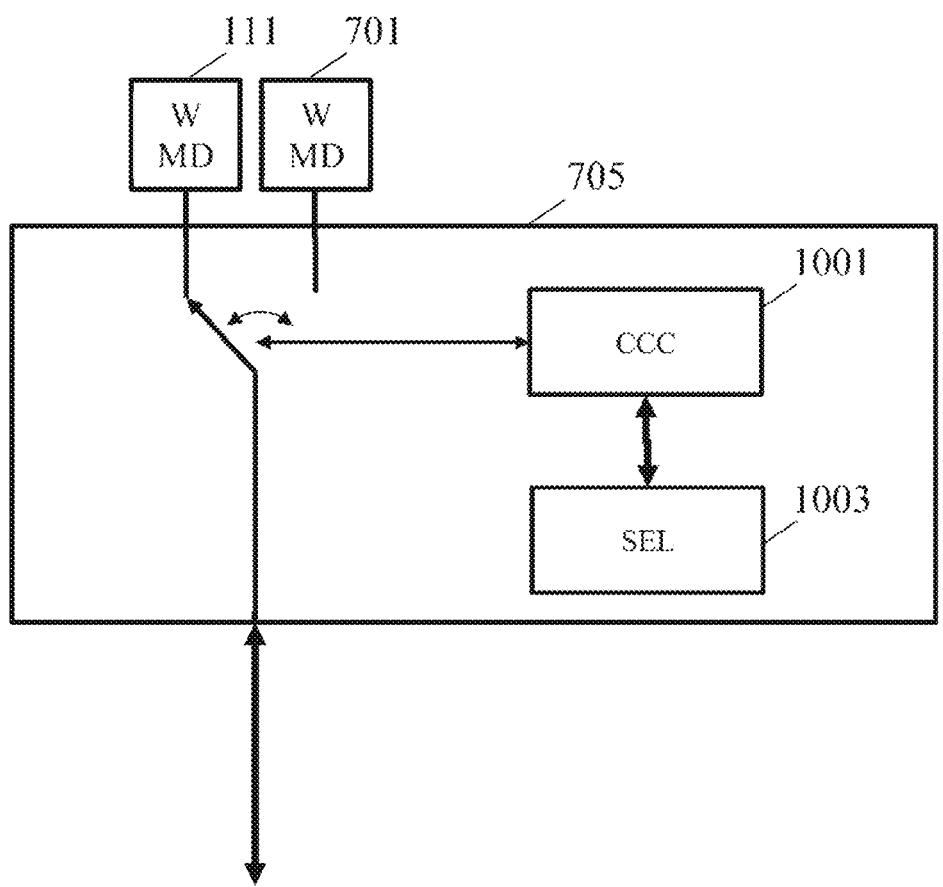
FIG. 10 illustrates an example of a common network element for a wireless communication system in accordance with some embodiments of the invention.

As illustrated in FIG. 10, the common network element/NPU 705 may provide a single connection point for a data session from the end node 105, and specifically may provide a single wired connection point for the data session. The single connection point is common for both the first and the second wireless modems 111, 701 and thus for the first and second mm wave radio communication links and thus the data communication for the data session that utilizes either the first mm wave radio communication link or the second mm wave radio communication link will also be via the single connection point.

In this system, when the common network element 705 switches from the first wireless modem 111 to the second co-located wireless modem 701, or from the second co-located wireless modem 701 to the first wireless modem 111, then this is done internally in the first common network element 705 by switching the coupling between the ports/interfaces to which the wireless modems are connected and the single wired connection point. Thus, no change is seen from the vehicle based network and no change in routing is needed.

The single wired connection point may specifically be a single port, and specifically a single Ethernet port, to which the rest of the vehicle network is connected. Thus, any data of the data session for the first and/or second mm wave radio communication links will be via the single port.

The single wired connection point may be a common connection point for the data session for both uplink and downlink data, i.e. both for data to the end node 105 from the correspondent node 105 as well as for data from the correspondent node 105 to the end node 105. However, in some embodiments, it will be appreciated that the single wired connection point may be a common connection point only for uplink or downlink data, i.e. it may be a common connection point for only one direction.

In the system, the common network elements 705, 707 provide a single wired connection point to the vehicle network for both (possibly all) mm wave radio communication links supported by the common network element for the data session. The vehicle network thus can operate continuously and without considering the specific selected mm wave radio communication link, and indeed need not adapt or even consider any switching. Indeed, from a vehicle network based point of view, there may be no difference between an air interface approach as disclosed and a conventional approach of coupling directly to a single wireless modem with a single connection. The additional air interface links may thus by the common network element and the specific switching may effectively be hidden from the vehicle network. This may provide substantial advantages as it may allow the improved air interface diversity to be introduced to an existing system without requiring modifications. It may provide interoperability with many existing network elements and products and may provide improved backwards compatibility.

The common network element may comprise a connection control circuit 1001 which is arranged to dynamically switch between the first and second mm wave radio communication links. The switching in the common network element may for example be achieved by changing a forwarding or routing table in the common network element, or by hiding or disabling one of the two interfaces to the wireless modems from the data plane. Switching is also required in the fixed network as described below. The connection control circuit 1001 may include switch functionality for directly performing the switching and rerouting of data or may in some embodiments be arranged to switch by controlling an external switch. Thus, the switch illustrated in FIG. 10 may be considered to be part of the connection control circuit 1001.

In many embodiments, the connection control circuit 1001 may further be arranged to select between the first and second mm wave radio communication links. Thus, the connection control circuit 1001 may not only implement the actual switching between the mm wave radio communication links but will also implement an algorithm to select between these.

The selection may specifically be based on radio link condition indications for the first link and the second link. For example, the wireless modems 111, 701 may continuously measure parameters of the air interface links and may generate an indication of the current quality of each of the first and second mm wave radio communication links.

Based on the link condition/quality indications, the connection control circuit 1001 may select whether the single wired connection point should be coupled to the first mm wave radio communication link or to the second mm wave radio communication link. If the radio link condition conditions for the first mm wave radio communication link and/or the second mm wave radio communication link meet a given switch criterion, the connection control circuit 1001 may proceed to switch from the currently selected mm wave radio communication link to the other.

It will be appreciated that different criteria may be used in different embodiments and that the specific criterion used in a given embodiment will depend on the specific preferences and requirements of the individual embodiment. Further examples and description will be described later.

In the described example, the vehicle comprises a plurality of sets of wireless modems for which all wireless modems are combined into a single wired connection point for the vehicle network. In particular, in the described example, a pair of a first and a second wireless modem 111, 701 are associated with a first common network element 705 which combines the connections for the wireless modems 111, 701 into a first single wired connection point. Similarly, a second pair of a third and a fourth wireless modem 113, 703 are associated with a second common network element 707 which combines the connections for the wireless modems 113, 703 into a second single wired connection point. The operation of the second pair wireless modems 113, 703 and the second common network element 707 may specifically operate in the same way as the first pair wireless modems 103, 701 and the first common network element 705. Thus, the description provided with respect to the first pair wireless modems 103, 701 and the first common network element 705 are equally appropriate (mutatis mutandis) to the second pair wireless modems 113, 703 and the second common network element 707. The second pair wireless modems 113, 703 may specifically provide a third and fourth mm wave radio communication links to access points with the second common network element 707 providing a common single wired connection point for these towards the vehicle network.

The described system further comprises functionality for communicating between the correspondent node 105 and the end node 101 simultaneously using multiple paths through the network. However, rather than treating each of the wireless modems/mm wave radio communication link as a possible subflow path, the first and second wireless modems/mm wave radio communication links are by the first common network element 705 managed as a single subflow path, i.e. the single first single wired connection point provides one subflow path for the multipath operation.

In some embodiments, the second pair of colocated wireless modems, i.e. the third and fourth wireless modems 113, 703 may by the second common network element 707 be managed to provide a second possible multipath subflow, i.e. the second single wired connection point may provide a second possible multipath subflow.

The system may accordingly comprise a multipath controller 713 which is positioned on the vehicle, i.e. it is part of the vehicle network segment. The multipath controller 713 may be arranged to communicate data of the data session with a complementary multipath controller of the fixed network over a plurality of paths. The multipath controller 713 is in the example illustrated to be part of the WiFi subsystem 711 but it will be appreciated that it may be located in any suitable part of the vehicle network system.

In the system, the fixed network may accordingly comprise a multipath controller which interworks with the multipath controller 713 in the vehicle network to provide an overall data flow between the end node 101 and the correspondent node 105 with the flow between the multipath controllers using a plurality of paths/flows. The multipath controller in the fixed network is thus a complementary multipath controller with respect to the multipath controller 713 of the vehicle network as it interworks with this to provide an overall flow using subflows between the multipath controllers. The multipath controllers may be arranged to divide data for transmission over the plurality of paths/flows and to combine data received over the plurality of paths/flows.

The complementary multipath controller may be located at any suitable location and in any suitable network element of the fixed network. In many embodiments, it may be part of a LMA or MAG functionality.

In the system, the multipath controller 713 has a first wired port which is connected to the first single wired connection point. The multipath controller 713 is arranged to use this first wired port for one subflow/path of the plurality of paths used to support the data session. Thus, the first and second mm wave radio communication links do not individually correspond to subflows/paths but the combination of these does correspond to a subflow/path. Thus, the first single wired connection point may provide a single path to the multiflow operation and this path/subflow may itself be based on one of a plurality of subpaths over the air interface, namely the first mm wave radio communication link and the second mm wave radio communication link. However, this further subdivision and plurality of paths are not handled by the multipath controller 713 and indeed will typically be implemented independently, and typically without the knowledge, of the multipath controller 713.

In many embodiments, the multipath controller 713 may comprise a second wired port for a second path of the plurality of paths and this may be connected to the second single wired connection point. Thus, the second set of colocated wireless modems may together be used to form a second single subflow/path.

The approach may provide improved operation in many embodiments. It may allow a very efficient communication with high throughput and may in particular provide efficient adaptation to quickly changing radio conditions. The approach may accordingly be highly suitable for fast moving vehicles and mm wave radio communication. Further, it may achieve this while allowing complexity of the multipath controller to be kept low. It may in particular facilitate (re)use of existing or low complexity equipment and provide improved backwards compatibility. For example, efficient multipath utilization of four different mm wave radio communication links may be achieved using a low complexity existing multipath controller that only supports two paths/flows.

As a specific example, the approach may allow quick selection between matching mm wave radio communication links to be performed close to the wireless modems thereby reducing delays and allowing more relevant radio condition data to be taken into account for the decision. This may result in faster and better informed link switching which is particularly suitable for fast moving vehicles. This will result in higher throughput to the vehicle. At the same time efficient multipath operation can be performed using the combined path without requiring this to consider the low level switching.

In the system, data of the end-to-end flow between the correspondent node 105 and the end node 101 may thus be communicated over different paths including over multiple mm wave radio communication links as described above. In many embodiments, the end-to-end flow may be divided into a number of subflows which may then be communicated over the different paths.

In such systems, aggregator functions may be included to control the multipath subflows. Such an aggregation function may have two parts. For transmission, it may schedule packets. For the downlink direction, this may simply involve identifying which packets to send on which downlink link, i.e., on which multipath. For the uplink, the same function may be used, or it may just involve putting data into the appropriate queue. For example, in the described scenario a multipath controller 713/aggregator on the train may push packets towards the first wireless modem 111 or the second wireless modem 113 depending on the latest radio metrics, and specifically dependent on a link condition/quality. Thus, typically, a multipath controller/aggregator includes a scheduling function for the transmission of data packets over subflows.

On the receiving side, a multipath controller may combine the received data packets into a single data stream for onwards transmission. The multipath controller may implement an aggregator function that typically includes a reordering of the received data packets and which may specifically operate a reordering queue to maintain in-sequence delivery. Thus, an in sequence single data flow may be generated where data packets are transmitted in the appropriate order.

Thus, in some embodiments, the multipath controller 713 may comprise an aggregator for aggregating data for the data session, the aggregating comprising aggregating data for at least a first aggregation port and a second aggregation port, the first aggregation port being connected to the first single wired connection point (and typically the second aggregation port being connected to the second single wired connection point).

In many embodiments, the system may thus include a fixed network multipath controller which is arranged to couple a connection for the correspondent node 105 to a plurality of subflows. On the vehicle there exists a corresponding multipath controller 713 providing a single connection from the multipath controller 713 to the end node 101. The multipath controllers may load balance packets out into multiple subflows between the multipath controllers.

Figure 11:
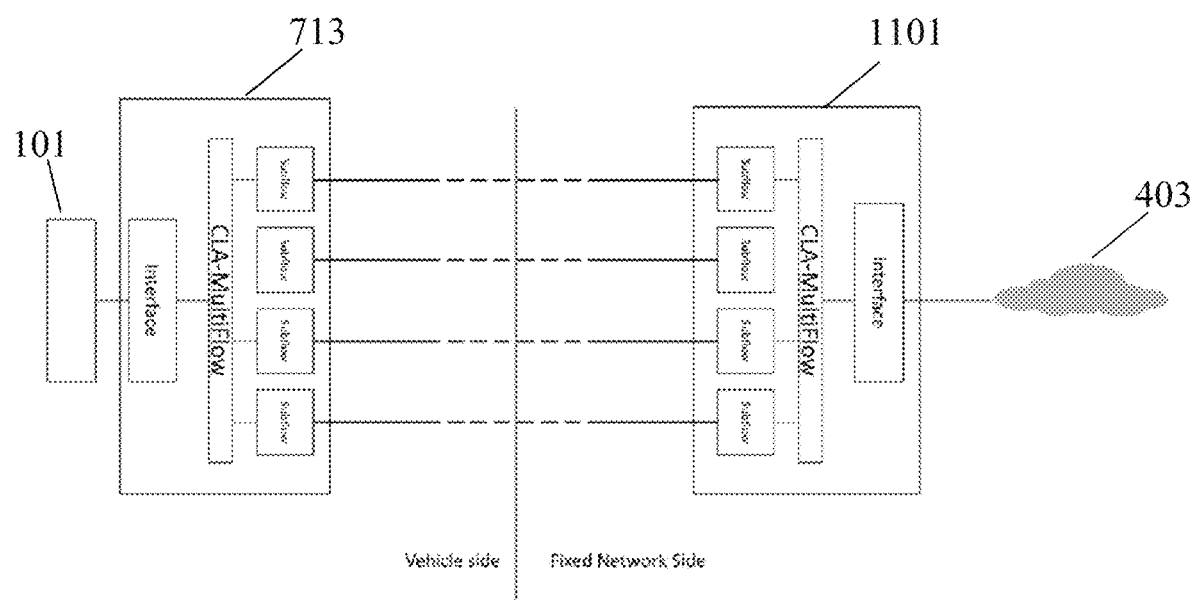
FIG. 11 illustrates an example of elements of a multipath controller arrangement suitable for a wireless communication system in accordance with some embodiments of the invention.

FIG. 11 illustrates an example of a system of two multipath controllers utilizing subflows for communication. In the example, a multipath controller 713 may provide a single flow connection for the end node 101 and a fixed network multipath controller 1101 may provide a single flow connection for the fixed network. The connection between the two multipath controllers is by a plurality of subflows each of which may use a different path.

Figure 12:
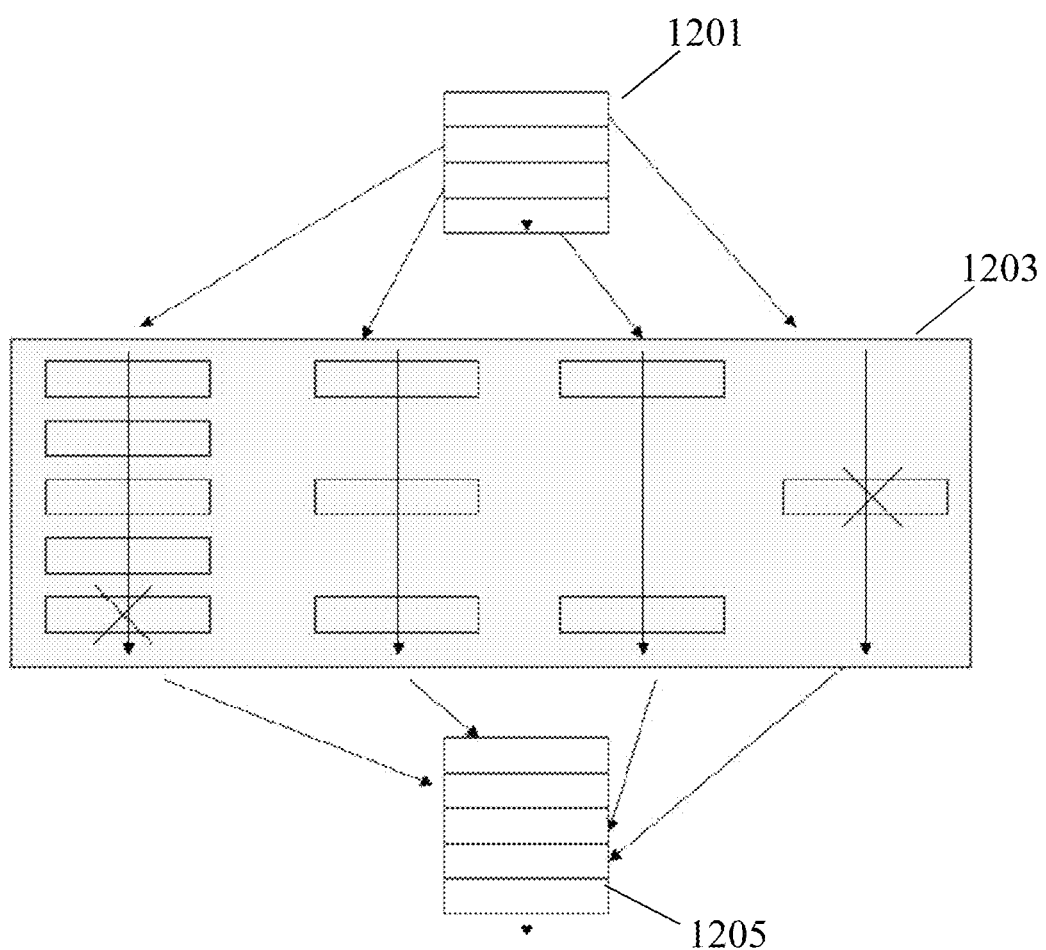
FIG. 12 illustrates an example of elements of a multipath controller arrangement suitable for a wireless communication system in accordance with some embodiments of the invention.

FIG. 12 illustrates an example of the operation of the multipath subflow communication. In the example, an input set of data packets 1201 are received in a given order. These may be routed via a plurality of subflows 1203 with data packets being distributed over the different subflows 1203. The subflows 1203 may then be combined into a single flow 1205, i.e., a single set of output data packets may be generated.

Due to different properties of the different subflows, the data packets may be received in a different order than in the input set of data packets 1201, and the receiving multipath controller may reorder the output data packets to have the correct order to generate and in-sequence data output.

The multipath controllers may for example comprise a MultiPath Transmission Control Protocol, MPTCP, proxy (as e.g., described in the Internet Engineering Task Force (IETF) RFC 6824 and US2016/0366049A1) which can provide functionality for mapping a single proxy connection to a plurality of subflows. In the system, each of the generated subflows is not merely a path/connection through the network but is specifically linked with a specific radio communication link and thus it represents/is linked to a specific wireless communication link across the air interface.

Specifically, the multipath controllers can use MPTCP in which case the subflows are individual TCP subflows that operate to the MPTCP termination point. There may be a MPTCP instance for each application running on the end node 101 which requires a TCP socket connection. The MPTCP may be terminated in the end node 101 when it operates a native MPTCP protocol stack.

In some embodiments, the multipath controller 713 may comprise (in addition to one (or more) mm wave links/connections) a path/or connection that may utilize a different air interface/radio access technology, such as e.g., an LTE communication link.

In some embodiments, the multipath controller 713 may be arranged to dynamically and flexibly manage the subflow communication. In some embodiments, the multipath controller 713 may be arranged to communicate data simultaneously over several paths/flows. For example, it may maintain a FIFO buffer for each subflow and may allocate new data packets to subflows depending on the level of filling of each subflow buffer. In other embodiments, a slower or less flexible approach may be used. For example, the multipath controller 713 may simply allocate data to one subflow as long as the buffer level does not increase above a given level. If this level is exceeded, it may indicate that the link/path for that subflow is no longer efficient (e.g. due to the mm wave radio communication links for that path no longer being able to support communication) and it may switch to exclusively use a different subflow for future communication.

As previously disclosed, the first selector 1003 may be arranged to select between the first and second mm wave radio communication links, and specifically may be arranged to select between these based on radio link condition indications for the first and second mm wave radio communication links.

A radio link condition indication for a mm wave radio communication link may be any indication of a quality of the link and specifically may be any measure indicative of a signal to noise ratio, capacity, error rate, throughput, signal strength etc.

In some embodiments, a radio link condition indication may specifically be a throughput indication. The throughput indication may for example be determined as a throughput measure derived from measurements of a plurality of parameters.

For example, an access point may report back the received signal to noise ratio and the wireless modem may forward this information to the first selector 1003. The first selector 1003 may then convert this to a throughput value, e.g., based on a predetermined formula or Look-Up-Table (LUT).

In some embodiments, the throughput for a mm wave radio communication link may directly be measured and used as a radio link condition indication.

In many embodiments, a radio link condition indication for a mm wave radio communication link may be a currently applied modulation and coding scheme for the mm wave radio communication link. In many systems, the applied modulation and coding scheme used for communication is dynamically adapted in order to maximize the throughput of the mm wave radio communication link. For example, if the error rate increases above a given threshold, a control message may be transmitted to cause the modulation and coding scheme to be changed to a more reliable but lower data rate scheme and if the error rate decreases below a given threshold, a control message may be transmitted to cause the modulation and coding scheme to be changed to a less reliable but higher data rate scheme.

In such systems, the currently determined modulation and coding scheme may directly reflect a data rate for communication over the mm wave radio communication link. The currently selected/applied scheme may thus reflect the quality of the mm wave radio communication link. For example, the less the attenuation and noise, the higher the data rate.

In some embodiments, a beacon signal strength value may be used as a radio link condition indication. For example, the measured beacon signal strength may be converted into a specific measure indicative of the quality of a mm wave radio communication link such as a throughput or attenuation for that mm wave radio communication link.

Such a radio link condition indication may be particularly advantageous as it is not reliant on active transmission of data over the mm wave radio communication link. It may be used for a mm wave radio communication link which has been established but which is currently not active. In such a case, it is possible that no data is exchanged at all over the mm wave radio communication link. However, the wireless modem supporting the mm wave radio communication link may measure the beacon strength, such as e.g. the current RSSI level, and either use this directly or convert it to another value. For example, a predetermined formula or LUT may provide a throughput estimate or a modulation and coding scheme estimate as a function of the RSSI level.

Management frames may be generated in an access point or modem of an established mm wave link that has not been selected by the connection control circuit. These frames are transmitted to the other end of the link, but no further. These can be used to carry measurements. Further, measurements such as signal strength can be performed on the management frames themselves.

It will be appreciated that a plurality of radio link condition indications may be used for each mm wave radio communication link or equivalently that each radio link condition indication may be a composite indication comprising a plurality of values or a combined value for a plurality of parameters indicative of a radio link condition.

It will be appreciated that the first selector 1003 may apply any suitable algorithm for selecting between the first and the second mm wave radio communication links, and in particular may apply a comparison criterion between the radio link condition conditions for the two mm wave radio communication links.

For example, in some embodiments, the first selector 1003 may simply be arranged to select the mm wave radio communication link for which the radio link condition indication indicative of the highest quality is received. Such a decision may for example include a suitable amount of low pass filtering and/or hysteresis.

For example, the first selector 1003 may be arranged to select the mm wave radio communication link with the highest (low pass filtered) RSSI or throughput indication. As another example, it may be arranged to switch from one mm wave radio communication link to the other if this exceeds the quality indication of the current mm wave radio communication link by more than a given threshold value.

As a specific example, the selection may be based on averaged beacon RSSI from the access points. In this example, the first selector 1003 may compare the averaged RSSI values for the currently selected mm wave radio communication link to that of the currently non-selected mm wave radio communication link. If this is higher by a given amount for longer than a given duration, then the first selector 1003 may change the selection.

Once the first selector 1003 selects a mm wave radio communication link (or changes the mm wave radio communication link) it controls the first connection control circuit 1001 to achieve the corresponding switching.

In many embodiments, the first selector 1003 may be arranged to select between the first and second mm wave radio communication links without any consideration of any parameters or characteristics for the third and fourth mm wave radio communication links, and specifically only parameters and conditions associated with the first and second mm wave radio communication link may be considered. This may provide for a fast and efficient selection but may prevent a more global optimization. In some embodiments, the selection between the first and second mm wave radio communication links may further consider characteristics for the third and fourth mm wave radio communication links as will be described in more detail later.

Figure 13:
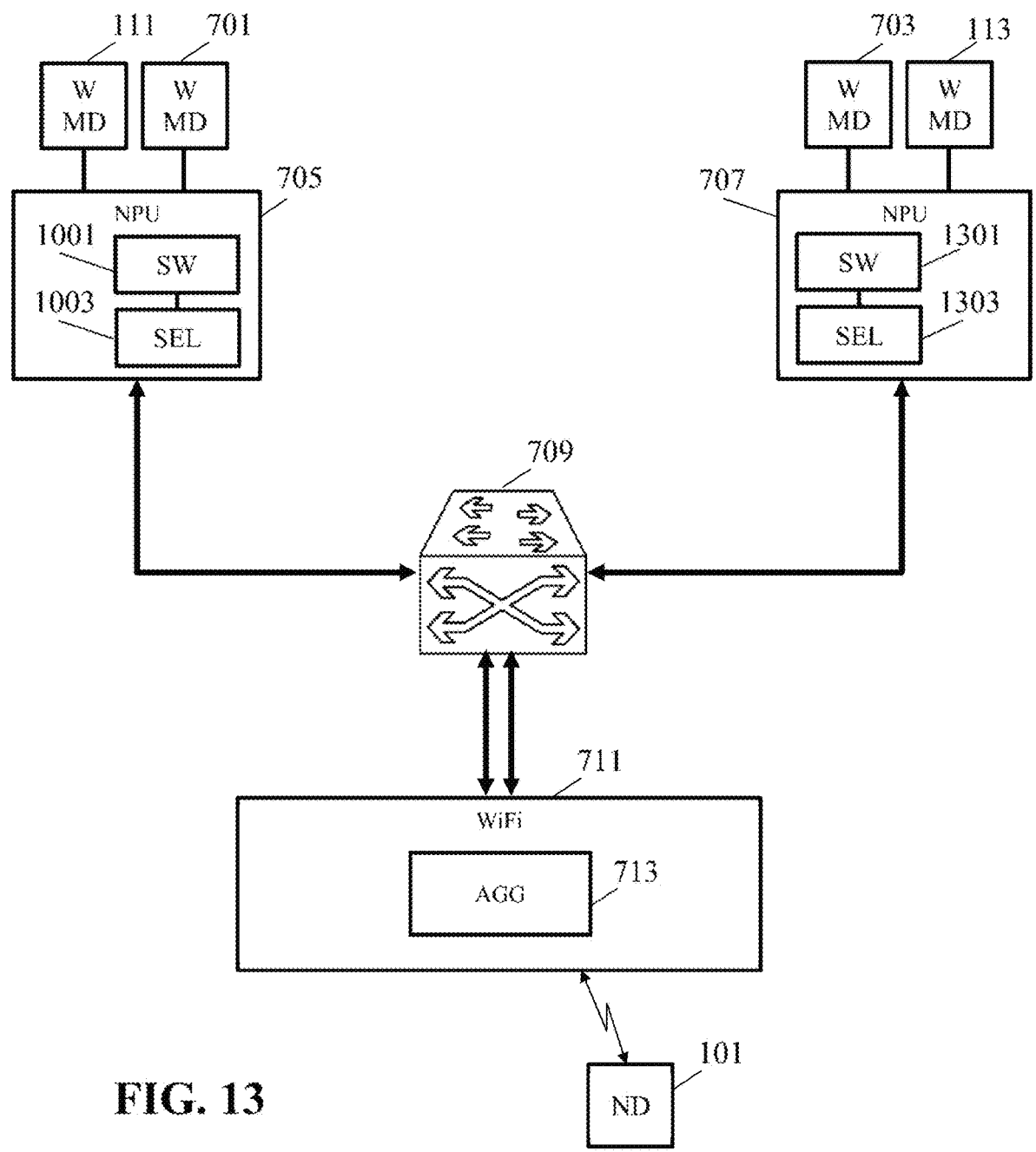
FIG. 13 illustrates an example of elements of a vehicle based network subsystem of a wireless communication system in accordance with some embodiments of the invention.

Similar to the first common network element 705 comprising a first connection control circuit 1001 and a first selector 1003, the second common network element 707 may comprise a second connection control circuit 1301 a second selector 1303 as illustrated in FIG. 13.

The operation of the second connection control circuit 1301 and the second selector 1303 may directly correspond to the operation of the first connection control circuit 1001 and the first selector 1003 and the comments and description provided above with respect to these apply equally (mutatis mutandis) to the second connection control circuit 1301 and the second selector 1303.

In particular, in many embodiments, the operation of the first selector 1003 and the second selector 1303 may be independent of each other and the selections between the first and second mm wave radio communication links and the third and fourth mm wave radio communication links respectively may be independent. However, in other embodiments, the selections may not be independent.

For example, in some embodiments, the selection by the first selector 1003 between the first mm wave radio communication link and the second mm wave radio communication link may take into account properties for the third mm wave radio communication link and the fourth mm wave radio communication link, including potentially which of the third and fourth mm wave radio communication links is selected and which access point is supporting the selected mm wave radio communication link.

Figure 14:
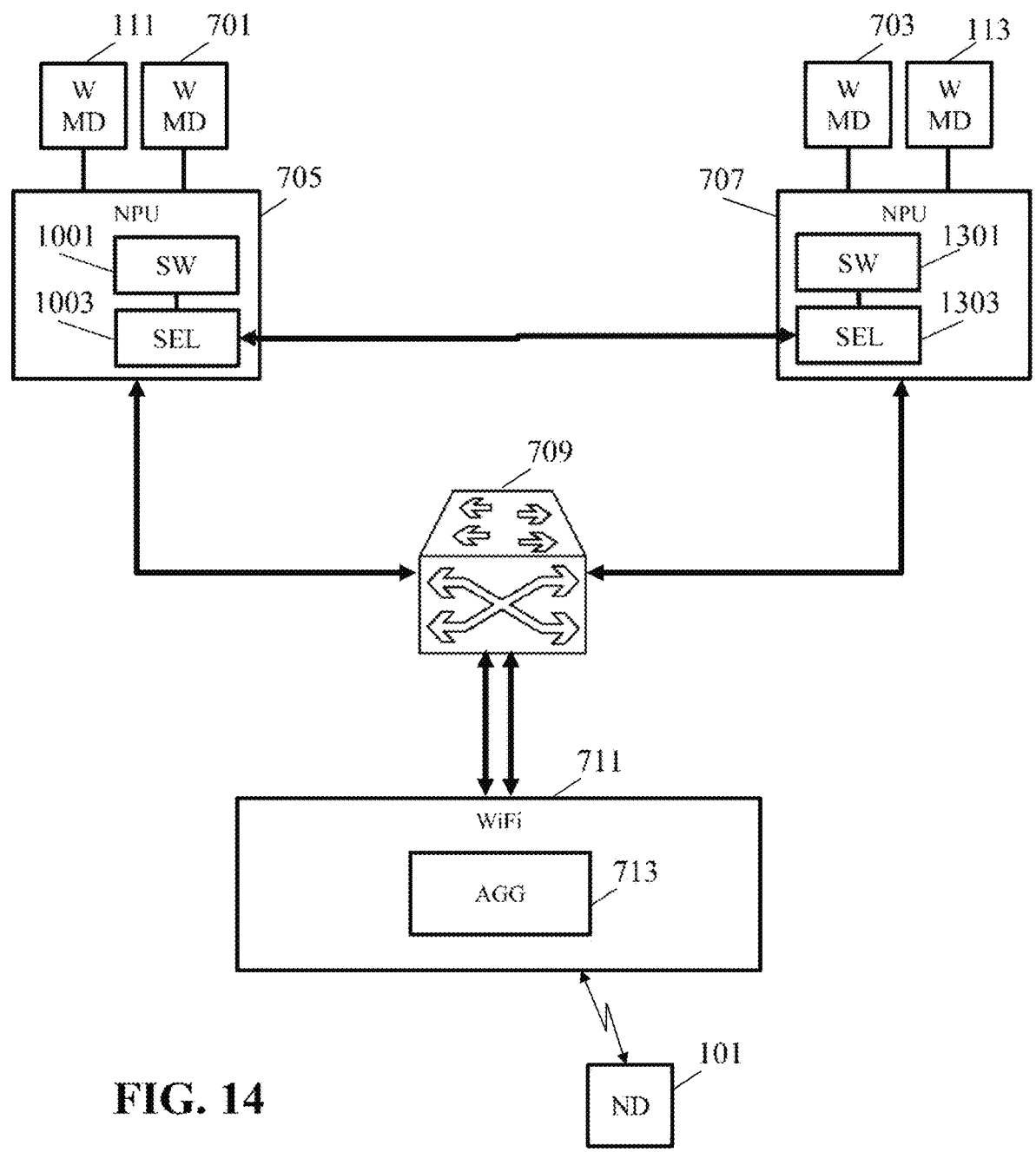
FIG. 14 illustrates an example of elements of a vehicle based network subsystem of a wireless communication system in accordance with some embodiments of the invention.

For example, as shown in FIG. 14, there may be a communication link between the first selector 1003 and the second selector 1303 which allows these to exchange information with each other. The communication link and information exchange may be unidirectional or in many embodiments may be bidirectional. The communication link is in FIG. 14 illustrated as a direct link between the first selector 1003 and the second selector 1303 but it will be appreciated that it is typically established via the network, and specifically via the vehicle-based segment of the network.

In some embodiments, the second selector 1303 may be arranged to send link selection messages to the first selector 1003 where a link selection message may include an indication of a link selection by the second selector 1303. The selection indication may indicate whether the second selector 1303 has selected the third or fourth mm wave radio communication link. The selection indication may directly indicate the third or fourth mm wave radio communication link, e g by providing an indication of the selected wireless modem or may e.g. provide an indication of the access point for the selected mm wave radio communication link.

In such embodiments, the first selector 1003 may be arranged to take the link selection into account when selecting between the first and second mm wave radio communication links. Thus, the selection between the first and second mm wave radio communication links may be dependent on the selection indication and on whether the second selector 1303 has selected the third or fourth mm wave radio communication links. For example, the first selector 1003 may bias the selection towards a different access point than selected by the second selector 1303.

In many embodiments, the second selector 1303 may be arranged to transmit radio condition messages to the first selector 1003. A radio condition message may comprise a radio link condition indication which is indicative of radio condition/quality for one of the third and fourth mm wave radio communication links, and typically for both the third and fourth mm wave radio communication links.

The specific radio link condition indication(s) may depend on the specific preferences and requirements for the individual embodiment. The radio link condition indication(s) may specifically be indicative of any radio link condition indicative of or dependent on a quality of the mm wave radio communication link, such as any measure indicative of a signal to noise ratio, capacity, error rate, throughput, signal strength etc.

It will be appreciated that the comments provided previously with reference to the radio link conditions/radio link condition indications for the first and second mm wave radio communication link considered by the first selector 1003 may apply equally for the radio link conditions/radio link condition indications for the third and fourth mm wave radio communication link. It is also noted that the same comments with respect to generation of the radio link condition indications are equally appropriate with respect to the second common network element 707 and the connected wireless modems 113, 703.

In some embodiments, the first selector 1003 may be arranged to take the radio link condition indications for the third and/or fourth link into account when selecting between the first and second mm wave radio communication links. For example, the throughput rate that can be achieved for the third/fourth link may be used to select between the first and second links. For example, if the throughput of the third link exceeds that of the fourth, it may be inferred that the second selector will select the third link, and if it is known that the third link is to the same access point as the first link, then the first selector could choose the second link even though the throughput may be less than that of the first link. This is because the first selector recognizes that the first and third links would need to share the air interface and the greatest aggregate throughput would be achieved by selecting link 2 (and link 3 by the other selector).

In some embodiments, the first selector 1003 may also be arranged to select between the third and fourth links. It may then transmit a selection message to the second selector 1303 which may be arranged to take the selection between the third and fourth links as indicated in the selection message into account. In many embodiments, the second selector 1303 may simply instruct the second connection control circuit 1301 to switch between the third and fourth mm wave radio communication links as indicated by the selection message.

Thus, in some embodiments, the selection between the third and fourth links may be performed by the first common network element 705. Thus, in some embodiments, the first common network element 705 may function as a master device with the second common network element 707 operating as a slave device. The first common network element 705 may make the decision with the second common network element 707 simply following the decision made in the first common network element 705. The first common network element 705 may generate a selection message comprising an indication of a selected link between the third link and the fourth link, and the second common network element is arranged to switch to the selected link in response to receiving the message.

In other embodiments, the second selector 1303 may be arranged to still evaluate a selection criterion to select between the third and fourth links without necessarily always following the received selection indication. However, the selection may be in response to the selection indication, and the selection criterion may include a consideration of the selection indication.

The selection between the third and fourth links by the first selector 1003 may be in response to a consideration of the radio link conditions for the third and/or fourth links. The selection may specifically be in response to the radio link condition indications received from the second common network element 707.

Indeed, in some embodiments, the first selector 1003 may simply select between the third and fourth links independently of properties of the first and second links, and e.g., only considering the radio link condition indications for the third and fourth links. For example, the first selector 1003 may select the link for which the radio link condition indications are indicative of the highest throughput or highest SNR.

Thus, in some embodiments, the first selector 1003 may simply perform operations that could be performed by the second selector 1303. However, this may still be advantageous in many embodiments, e.g., in order to reduce complexity of one common network element or to allow existing functionality to be reused. For example, it may allow easy adaptation and optimization of the selection algorithms as only one common network element needs to be modified and e.g., as the same algorithm and functionality can be reused for selection both between the first and second links as well as between the third and fourth links.

Alternatively, or additionally, the first selector 1003 may be arranged to select between the third and fourth links in response to a consideration of a selection between the first and second links. For example, the selection between the third and fourth links may be such that these will use a different access point than the first/second link. Such an example may be similar to the previously described approach of the first selector 1003 transmitting an indication of the selection between the first and second link to the second selector 1303 with this being taken into consideration when selecting between the third and fourth links. However, in this case, both selections may be performed by the first selector 1003.

Alternatively, or additionally, the first selector 1003 may be arranged to select between the third and fourth links in response to radio link condition indications for at least one of the first and second links. For example, similarly to the first selector 1003, selecting between the first and second links based on the radio link condition indications of the third and fourth links, the first selector 1003 may select between the third and fourth links based on radio link condition indications for the first and second links.

Thus, as a specific example the first common network element 705 may act as a master the second common network element 707 may act a slave which periodically sends radio condition messages in the form of measurement reports to the master over the vehicle network segment. Such reports may include radio link conditions such as:
List of associated links (size 0,1,2)
Link number
Link activated (Boolean)
Beacon RSSI
MCS (for activated link)
After a selection resulting in a switch, the first common network element
705 may transmit a selection message including e.g. data fields indicating:
Message type ('switch')
Target interface
Switching time.

In many embodiments, it may be advantageous to perform a joint selection of the links, i.e., to jointly select between the first and second links and between the third and fourth links.

In some embodiments, the first selector 1003 may evaluate different candidate selections. Each candidate selection may correspond to a combination of a selection of one of the first and second links and a selection of one of the third and fourth links. Typically, all four selection combinations may be considered (it will be appreciated that if each common network element is arranged to switch between more links, more than four candidate selections/combinations may be considered).

For each selection combination, a combined link capacity/throughput may be determined, and a selection criterion may be evaluated taking this combined link capacity into account. As an example, the selection criterion may select the candidate selection/combination which results in the highest combined link capacity. The first selector 1003 may then proceed to select the links for the selected candidate combination, i.e., it will select the link of the first and second links that was included in the selected candidate combination and it will select the link of the third and fourth link that was included in the selected candidate combination.

In this example, the selections are thus coordinated. As an example, the second selector 1303 may transmit radio link condition indications/measurement reports of the third and fourth link to the first selector 1003 with the four potential link combinations being evaluated. The four combinations are:

A Link 1, Link 3
B Link 1, Link 4
C Link 2, Link 3
D Link 2, Link 4.

A pseudo code example of a possible implementation is as follows:

```
/* A: Rate1+3 */
If both selected links connect to same AP
rate1_3=mean(link1_rate,link3_rate)
% assumes equal time scheduling
Else
rate1_3=sum(link1_rate,link3_rate)
End
/* B: Rate1+4 */
Rate1_4=sum(link1_rate,link4_rate)
/* C: Rate2+3 */
Rate2_3=sum(link2_rate,link3_rate)
/* D: Rate2+4 */
If both selected links connect to same AP
rate2_4=mean(link2_rate,link4_rate)
% assumes equal time scheduling
Else
rate2_4=sum(link2_rate,link4_rate)
End
sum_rate=max(rate1_3,rate1_4,rate2_3,rate2_4)
```

It should be noted that the aggregate rates of combinations A and C are dependent on the air interface scheduling discipline employed, in the case that both links involved connect to the same access point. In the example above each link is given equal air time, but other disciplines could allocate the air time unequally.

In many embodiments, the selection criterion may not be a simple selection of the maximum aggregate link capacity but may take other aspects into consideration.

In some embodiments, the criterion is dependent on whether the candidate links of the combination are to different access points or the same access point. Specifically, the selection criterion may be arranged to bias the selection towards a combination for which the selected links are formed to different access points. The information of the access point supporting a given link may be provided to the common network elements 705, 707 by the wireless modems providing the MAC address of the access point supporting the link to the common network elements 705, 707. The second selector 1303 may transmit an indication of the access points to the first selector 1003, e.g. by directly transmitting the MAC address of the supporting access points.

Exploiting different access points may often provide improved performance, such as e.g. greater throughput (because the selected links do not share the same air interface resource) or increased reliability. It may typically provide increased diversity and independence between the links. For example, the approach may be less sensitive to links dropping due to radio propagation conditions degrading, e.g. due to the vehicle moving away from one access point into a position where an object blocks links from the access point to both of the attached modems.

Further, it may allow better exploitation of the access point resource. For example, when using a TDMA approach, selecting different access points may prevent that the links have to time share the same TDMA frame/resource.

In some embodiments, the selection criterion may be dependent on a number of switches of links that are required to switch to the combination from a currently employed combination. Thus, the selection may be dependent on whether the combination will result in no switching of links, of switching of one link, or of switching of two links. Specifically, the selection criterion may bias towards selections resulting in fewer switches.

An advantage of such an approach is that it factors in the loss of connectivity that occurs on interface switching into the evaluation.

In some embodiments, the selection message transmitted to the second common network element 707 may comprise an indication of a timing for a change of the selected mm wave radio communication link. Thus, in some embodiments, the second selector 1303 may not immediately switch in response to receiving a selection message but may proceed to time this in accordance with the timing indication. Thus, the second selector 1303 may delay the switching by an appropriate amount.

This may for example be used to synchronize the switching between the first common network element 705 and the second common network element 707. This may in many embodiments provide improved performance when switching is desired at both common elements. This is because it avoids a transition to an intermediate state when only one switch has occurred which may offer less throughput than the initial or final states.

As a very specific example, the following approach may be adopted by the first selector 1003:

Estimate the throughput for each selection combination (e.g. using an RSSI to MCS mapping)

If the throughput gain for switching the links of both the first common network element 705 and the second common network element 707 exceeds a value of X2% then this is executed at a specified time in the future.

Else, if the throughput gain for a single switch, i.e. a switch of a link of the first common network element 705 or the second common network element 707, exceeds X1% then this switch is executed at a specified time in the future.

The design parameters X1 and X2 may be configured for the specific preferences of the individual embodiment. X2 will typically be larger than X1.

In some embodiments, the selection between the third and fourth links may as mentioned previously be made exclusively by the first selector 1003 with the second common network element 707 simply performing the switching as instructed in the received selection message. In some embodiments, the selection between the third and fourth links may exclusively be performed by the second selector 1303.

However, in some embodiments a partial and more distributed approach may be used. In many embodiments, the second selector 1303 may be arranged to dynamically select between the third and fourth links based on radio link conditions for the third and/or fourth link. For example, an approach such as described previously may be used. Specifically, the second selector 1303 may switch to the other link if a quality measure for this link has exceeded the corresponding quality measure for the current link by a predetermined amount for a predetermined duration. This may ensure quick adaptation to fast changing radio conditions and is highly suited to communication in fast moving vehicles using mm wave radio communication.

However, at the same time the second selector 1303 may send radio link condition indications to the first selector 1003 which may also proceed to perform selection between the third and fourth links. However, this selection approach may typically be performed also taking into account radio link conditions for the first and second links and/or the selection between these. Specifically, the first selector 1003 may perform a joint selection including a consideration of which access points are supporting the different links.

The selection algorithms and operations may for example be designed such that the second selector 1303 can make quick and frequent selections resulting in relatively frequent selections that however may only provide relatively small improvements. In contrast, the first selector 1003 may be arranged to only change selection when larger gains can be achieved. The first selector 1003 may thus cause switches relatively infrequently but these may have a larger effect.

The first selector 1003 may in such embodiments be arranged to perform the selection and switching unless a selection message specifying a specific selection is received from the first selector 1003. If such a message is received, the second selector 1303 may follow the first selector 1003 and perform the required switch. This selection may then be maintained for a certain duration after which the second selector 1303 may again change the selection. Thus, in such embodiments, the second selector 1303 may select between the third and fourth links based on local radio conditions unless the selection is overridden by a selection made by the first selector 1003.

In some embodiments, the first selector 1003 may proceed to select between the first and second links based on local considerations. In addition, the first selector 1003 may transmit a selection property message to the second common network element 707 which comprises an indication of link property of a currently selected link between the first and second link. The selection property message may for example be transmitted at periodic intervals or whenever a new selection is made.

The link property may be indicative of a property of the selected link. The property may e.g., be a property indicative of a radio link condition for the link.

In many embodiments, the link property may comprise an indication of the access point that supports the currently selected link. For example, identification data for the access point may be provided such as a network address (e.g., an IP or MAC address) or a beacon identifier. As a specific example, the link property may indicate a BSSID of the access point supporting the currently selected link.

In such embodiments, the second selector 1303 may perform the selection between the third and fourth links in response to the link property. Specifically, the second selector 1303 may be arranged to bias the selection away from a link that is supported by the same access point as that which supports the selected first or second link. For example, a threshold applied in the selection criterion may be varied depending on whether the current link or the target link are formed with an access point that is currently also supporting the selected first or second link.

As previously mentioned, using different access points may be advantageous and may provide improved radio diversity and/or more efficient resource usage.

The previous embodiments have focused on embodiments where selection is independent or implemented in a master/slave arrangement. However, in some embodiments, a more peer-to-peer selection approach may be used where the common network elements 705, 707 exchange information and then individually perform local selection based on the received data as well as locally generated data.

Specifically, as previously described, the first common network element 705 may locally determine radio link conditions for one of, and typically both of the first and second mm wave radio communication links. In addition, the first common network element 705 may receive indications of the radio link conditions for the third and fourth mm wave radio communication links from the second common network element 707. It may then proceed to perform selection between the first and second links based on the information for all the links, e.g. by the joint selection approached previously described.

However, in some embodiments, the selection result for the third and fourth link may not be transmitted to the second common network element 707. Rather, in some embodiments, the first common network element 705 may be arranged to transmit indications of the radio link conditions for the first and/or second link to the second common network element 707. The second selector 1303 may then proceed to perform selection based on these indications.

Specifically, the first selector 1003 and the second selector 1303 may have exactly the same radio link condition information. Further, the first selector 1003 and the second selector 1303 may perform selection between the links using the same selection algorithm and selection criterion. As the algorithm/selection criterion is the same and the information may be the same, the first selector 1003 and second selector 1303 will independently perform the same selections and thus the coordination between the first common network element 705 and the second common network element 707 can be achieved without relying on a master/slave arrangement.

The selection criterion applied for the selection between the first and second, and third and fourth links may typically be combined/joint consideration of all four possible combinations as previously described.

The selection algorithms may be performed at suitable times, such as e.g., periodically with a sufficiently high frequency that the required adaptation is achieved. This may further be based on sufficiently frequent exchange of radio link conditions.

In some embodiments, the first common network element 705 may be arranged to transmit a radio condition message comprising radio link condition indications for the first link and the second link to the second common network element when it determines that a change should be made to the selection, i.e., specifically when it determines to change the selection between the first and second link.

This selection decision may be based considering only changes in the radio link conditions for the first and second links, and specifically may be a different selection criterion than the one performing selection based on all radio link conditions.

Thus, the radio condition message may not only indicate the radio link condition itself but may also indicate that the first common network element 705 considers a change to be appropriate. The second common network element 707 when receiving the message may proceed to perform a selection evaluation considering the newly received radio link condition information in the selection decision. It may specifically perform a combined selection considering conditions of all of the links.

Further, as the radio link conditions may have changed for the third or fourth link since the last message to the first common network element 705, the second common network element 707 may further generate and transmit a radio condition message comprising radio link condition indications for the third link and the fourth link to the first common network element 705.

The first selector 1003 and the second selector 1303 may thus proceed to perform the selection evaluation using the same selection algorithm based on the exchanged information, and thus based on the same information. Accordingly, the first selector 1003 and the second selector 1303 will result in the same decision and may proceed to switch in accordance with the selection.

Such an approach may for example reduce the amount of processing and information exchange required. For example, both the first selector 1003 and the second selector 1303 may proceed to continuously evaluate the current selection based on the latest received radio link conditions for the remote links and up-to-date information based on the local links. As both common network elements do this, a change in one link sufficient to merit a likely selection change will result in new radio link conditions information being exchanged allowing an accurate decision of whether a change should be affected.

In some embodiments, radio link condition messages may alternatively or additionally be transmitted when no likely selection is detected. For example, a new radio link condition message may be transmitted after a given time interval in order to avoid the information used at the other first common network element to be too far out of date.

In some embodiments, the first common network element 705 and second common network element 707 may exchange information to synchronize any switching. For example, the radio link condition message may indicate a timing for any switching. Thus, if the selection evaluation based on updated radio link condition information results in a switch between local links, that will be performed at the given time instant.

A specific example of a peer-to-peer algorithm where both common network elements run the same software will be described.

In the example each common network element maintains the following values:
preferred link value (could be NULL if no associations)
preferred BSSID
e.g. based on a selection criterion considering only local links.
The common network element may further maintain the following values:
active link (could be NULL if no associations)
active BSSID.

When the preferred link changes in accordance with the selection criterion, a measurement report in the form of a radio link condition messages comprising radio link conditions is transmitted to the other common network element. The common network element responds with a corresponding measurement report in the form of a radio link condition message of its own (measurement_report_response).

An algorithm is then executed to select the preferred links, e.g., using the combined selection previously described. Since both common network elements run the same algorithm using the same information they will come to the same decision.

If the common network elements are synchronized an execution time can be included in the initial measurement_report.

Figure 15:
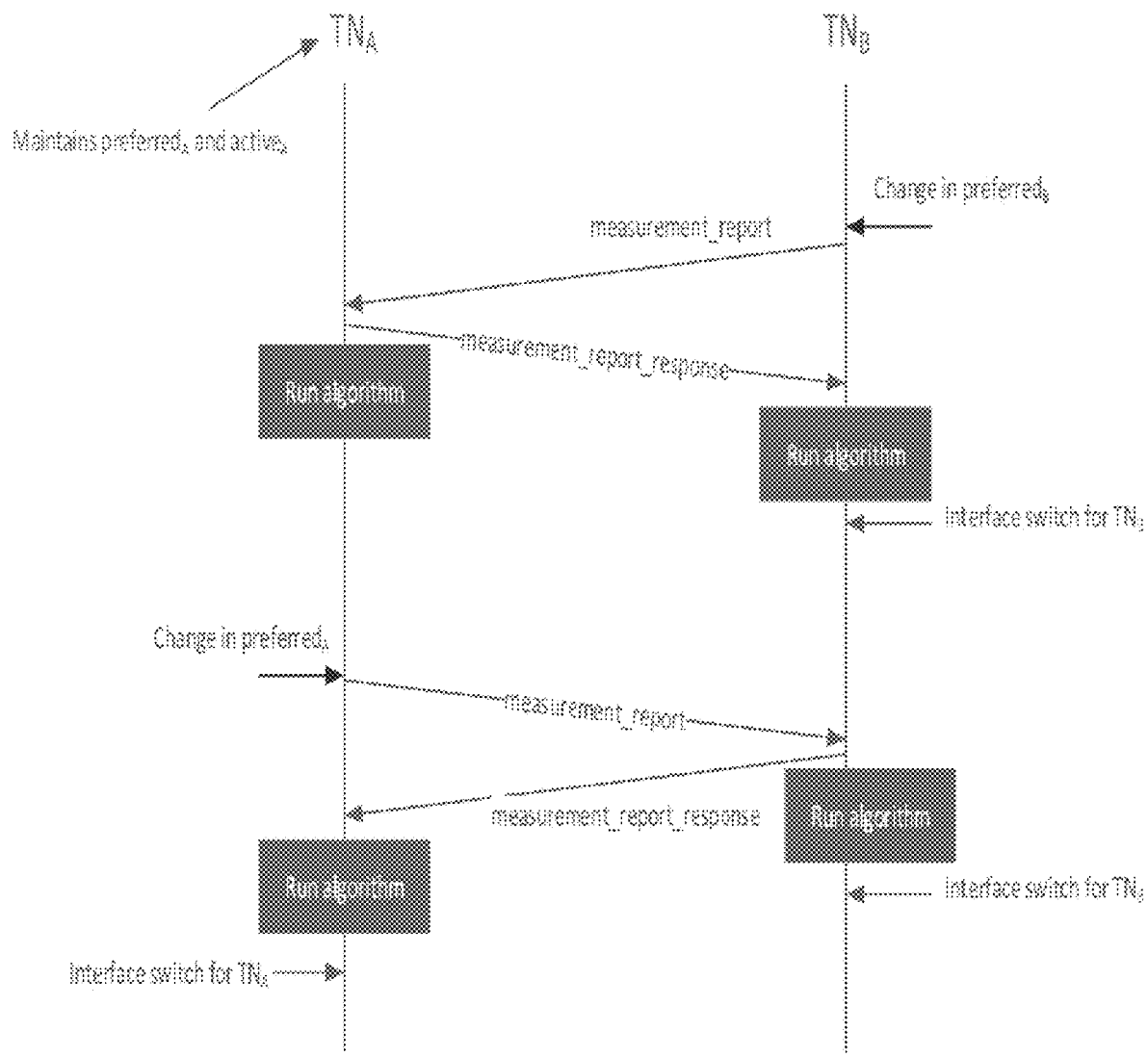
FIG. 15 illustrates an example of exchange of messages in a wireless communication system in accordance with some embodiments of the invention.

An example of a possible message flow is shown in FIG. 15 where the first common network element 705 is denoted $TN_A$ and the second common network element 707 is denoted $TN_B$.

Measurement_report and measurement_report_response format may be:
List of associated links (size 0, 1, 2)
Link number
Link activated (Boolean)
Beacon RSSI
MCS (for activated link)—this would probably be some averaged value
BSSID
Report_id
for report: an integer that increments by 1 for each generation (modulo 256 say)
for response: integer equal to the report id that triggered it
Message type (measurement_report or measurement_report_response).

An example of a pseudo code implementation is provided in the following:

```
If preferred_BSSID_A == preferred_BSSID_B
If #links_A+#links_B==2
/* one each, allow both preferred links */
active_A=preferred_A
active_B=preferred_B
Else if #links_A+#links_B==3
/* TN with 2 links must use the non-preferred link */
If #links_A=1
active_A=preferred_A
active_B=~ (preferred_B)
Else
active_A=~ (preferred_A)
active_B=preferred_B
Else if #links_A+#links_B==4
If MCS_preferred_A >= MCS_ preferred_B
active_A=preferred_A
active_B=~ (preferred_B)
Else
active_A=~ (preferred_A)
active_B=preferred_B
Else
active_A=preferred_A
active_B=preferred_B
End
```

Key:
links_A the number of associated links for TN A
active_A the active link of TN A
preferred_A the preferred link of TN A
~ (preferred_A) the non-preferred link of TN A If there is no response to a measurement_report within a specified time, then the common network element may in some embodiments set the active link equal to the preferred link.

In some embodiments the common network element may comprise (or be) a network bridge. The network bridge may implement a bridge between the wireless modems and the wired interface of the common network element (which provides a connection to the vehicle network segment).

The bridge may thus provide the single wired connection point towards the vehicle network segment and may provide one connection point for each of the wireless modems. The bridge may provide a connection point for the data session to the vehicle network segment (also referred to as the southside) and may provide a connection point for the data session for each wireless modem.

In this case, the switching between the first and second mm wave radio communication links, and thus between the first and second wireless modems, may be by changing which northside port/connection point is bridged with the southside port/connection point, i.e. with the single wired connection point.

The bridge may accordingly provide a plurality of interfaces to which the wireless modems are connected, with each interface providing a single connection point with a separate MAC address. The different colocated wireless modems are coupled to different interfaces such that each interface is only linked with one wireless modem.

In such an example, the switching may be achieved by adding and removing interfaces of the bridge to which the wireless modems are connected. For example, a switch from the first mm wave radio communication link to the second mm wave radio communication link is achieved by removing the interface for the first wireless modem from the bridge and adding the interface for the second wireless modem to the bridge for the single wired connection point.

In such embodiments, the connection control circuit 1001 may accordingly select between the first and second mm wave radio communication links by activating one of the interfaces and deactivating the other interfaces to which a wireless modem is coupled.

An advantage of using network bridges as common network element functions is that it may provide a more practical implementation. Interface switching may be achieved with low complexity and low latency. The approach may allow reuse of existing functionality, e.g. by allowing low complexity adaptation of conventional bridging built into the network software (for example, the linux kernel) to be used for the specific implementation described. Furthermore, adding and removing interfaces from the bridge is faster than bringing the interfaces up or down.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g., a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

We claim:

1. A communication system for supporting communication between an end node of a vehicle and a remote correspondent node via a fixed network, the communication system comprising:

a first wireless modem arranged to establish a first link being a first mm wave radio communication link to a first access point of a plurality of wireless access points of the fixed network, each wireless access point having a directional antenna arrangement for mm wave radio communication using directional beams, the first link supporting a data session between the end node and the remote correspondent node, the first wireless modem being located on the vehicle and employing a first electronically steerable beamforming directional antenna having a first main beam for establishing the first mm wave radio communication link;

a second wireless modem arranged to establish a second link being second mm wave radio communication link to a second access point further supporting the data session, the second wireless modem being located on the vehicle and employing a second electronically steerable beamforming directional antenna having a second main beam for establishing the second mm wave radio communication link;

a first common network element located on the vehicle and arranged to provide a first single wired connection point for the data session, the first single wired connection point being common for the first link and the second link and the first common network element being arranged to dynamically switch between the first link and the second link for the data session; and a multipath controller located on the vehicle separate to the first common network element and arranged to communicate with a complementary multipath controller of the fixed network over a plurality of paths, the multipath controller having a first wired port for a first path of the plurality of paths connected to the first single wired connection point;

a third wireless modem arranged to establish a third link being a third mm wave radio communication link to a third access point supporting a data session between the end node and the remote correspondent node, the third wireless modem being located on the vehicle and employing a third electronically steerable beamforming directional antenna having a third main beam for establishing the third mm wave radio communication link;

a fourth wireless modem arranged to establish a fourth link being a fourth mm wave radio communication link to a fourth access point further supporting the data session, the fourth wireless modem being located on the vehicle and employing a fourth electronically steerable beamforming directional antenna having a fourth main beam for establishing the fourth mm wave radio communication link;

a second common network element arranged to provide a second single wired connection point for the data session, the second single connection point being common for the third link and the fourth link and the second common network element being arranged to dynamically switch between the third link and the fourth link for the data session, the second common network element being separate to the first common network element and the multipath controller; and wherein the multipath controller has a second wired port for a second path of the plurality of paths connected to the second single wired connection point; and the first common network element comprises a first selector arranged to select between the first link and the second link in response to radio link condition indications for the first link and the second link, the second common network element is arranged to transmit a radio condition message to the first common network element, the radio condition message comprising a first radio condition indication for at least one of the third link and the fourth link; and the first selector is arranged to select between the first link and the second link in response to the first radio condition indication.

2. The communication system of claim 1, wherein the first common network element comprises a first selector arranged to select between the first link and the second link in response to radio link condition indications for the first link and the second link.

3. The communication system of claim 1 wherein the first common network element comprises a first selector arranged to select between the first link and the second link in response to radio link condition indications for the first link and the second link and the first selector is arranged to select between the first link and the second link independently of characteristics of the third link and the fourth link.

4. The communication system of claim 1, wherein the first common network element comprises a first selector arranged to select between the first link and the second link in response to radio link condition indications for the first link and the second link and the second common network element comprises a second selector arranged to select between the third link and the fourth link in response to radio link condition indications for the third link and the fourth link.

5. The communication system of claim 1, wherein the first selector is arranged to select between the third link and the fourth link in response to the first radio condition indication and a second radio condition indication for at least one of the first link and the second link.

6. The communication system of claim 5, wherein the first selector is arranged to determine a combined link capacity indication for a plurality of combinations of a first candidate link from a set comprising the first link and the second link and a second candidate link from a set comprising the third link and the fourth link; to select a first combination of the plurality of combinations for which the combined link capacity meets a first criterion, and to select the first candidate link of the first combination for the first single wired connection point and the second candidate link of the first combination for the second single wired connection point.

7. The communication system of claim 6, wherein the first criterion is dependent on whether the candidate links of the combination are to different access points or a same access point.

8. The communication system of claim 6, wherein the criterion is dependent on a number of switches of links are required to switch to the combination from a currently employed combination.

9. The communication system of claim 4, wherein
the second common network element is arranged to transmit the radio link condition indications for the third link and the fourth link to the first common network element;
the first common network element is arranged to transmit the radio link condition indications for the first link and the second link to the second common network element;
the first selector is arranged to select between the first link and the second link and between the third link and the fourth link in response to the radio condition indications for the first link and the second link and the radio condition indications for the third link and the fourth link;
the second selector is arranged to select between the first link and the second link and between the third link and the fourth link in response to the radio condition indications for the first link and the second link and the radio condition indications for the third link and the fourth link; and
the first selector and the second selector uses a same selection criterion for selection.

10. The communication system of claim 9, wherein the first common network element is arranged to transmit a radio condition message comprising at least one radio link condition indication for the first link and the second link to the second common network element in response to a change in radio link conditions for at least one of the first link and the second link meeting a criterion.

11. The communication system of claim 10, wherein the second common network element is arranged to transmit a radio condition message comprising at least one radio link condition indication for the third link and the fourth link to the first common network element in response to receiving the radio condition message comprising at least one radio link condition indication for the first link and the second link.

12. The communication system of claim 1, wherein the first radio condition indication includes at least an indication of a parameter of the group of:
a beacon signal strength value;
an applied modulation and coding scheme; and
a throughput.

13. The communication system of claim 1, wherein the first common network element comprises a first selector arranged to select between the first link and the second link in response to radio link condition indications for the first link and the second link and the first selector is arranged to transmit a selection message to the second common network element, the selection message comprising an indication of a selected link between the first link and the second link; and the second common network element is arranged to select between the third and the fourth mm wave radio communication links in response to the indication of the selected link.

14. The communication system of claim 13, wherein the selection message comprises an indication of a timing for a change of selected mm wave radio communication link.

15. The communication system of claim 1, wherein the second common network element is arranged to select between the third link and the fourth link in response to radio conditions for the third link and the fourth link unless overridden by a selection between the third link and the fourth link by the first common network element.

16. The communication system of claim 1, wherein the first common network element comprises a first selector arranged to select between the first link and the second link in response to radio link condition indications for the first link and the second link and the first selector is arranged to select between the third link and the fourth link and to transmit a selection message to the second common network element, the selection message comprising an indication of a selected link between the third link and the fourth link; and the second common network element comprises a second selector arranged to select between the third link and the fourth link in response to the indication of the selected link.

17. The communication system of claim 1, further comprising a circuit for estimating at least one of a throughput and a modulation and coding scheme for the first link in response to a signal strength of a transmission from the first access point when the second link is switched to the first single wired connection point; and wherein a selection between the first link and the second link is in response to the at least one of the throughput and the modulation and coding scheme.

18. The communication system of claim 1, wherein the first common network element comprises a first selector arranged to select between the first link and the second link in response to radio link condition indications for the first link and the second link and the first selector is arranged to transmit a selected link property message to the second common network element, the selected link property message comprising an indication of link property of a currently selected link between the first link and the second link; and the second common network element is arranged to select between the third link and the fourth link in response to the indication of the link property.

19. The communication system of claim 18, wherein the link property comprises an indication of a selected access point being an access point supporting the currently selected link.

20. The communication system of claim 18, wherein the second common network element is arranged to bias selection away from a link being supported by the access point supporting the currently selected link.

21. A method of operation for a communication system supporting communication between an end node of a vehicle and a remote correspondent node via a fixed network, the method comprising:
a first wireless modem establishing a first link being a first mm wave radio communication link to a first access point of a plurality of wireless access points of the fixed network, each wireless access point having a directional antenna arrangement for mm wave radio communication using directional beams, the first link supporting a data session between the end node and the remote correspondent node, the first wireless modem being located on the vehicle and employing a first electronically steerable beamforming directional antenna having a first main beam for establishing the first mm wave radio communication link;
a second wireless modem establishing a second link being second mm wave radio communication link to a second access point further supporting the data session, the second wireless modem being located on the vehicle and employing a second electronically steerable beamforming directional antenna having a second main beam for establishing the second mm wave radio communication link;
a first common network element located on the vehicle providing a first single wired connection point for the data session, the first single wired connection point being common for the first link and the second link and the first common network element dynamically switching between the first link and the second link for the data session; and
a multipath controller located on the vehicle communicating with a complementary multipath controller of the fixed network over a plurality of paths, the multipath controller having a first wired port for a first path of the plurality of paths connected to the first single wired connection point;
a third wireless modem establishing a third link being a third mm wave radio communication link to a third access point supporting a data session between the end node and the remote correspondent node, the third wireless modem being located on the vehicle and employing a third electronically steerable beamforming directional antenna having a third main beam for establishing the third mm wave radio communication link;
a fourth wireless modem establishing a fourth link being a fourth mm wave radio communication link to a fourth access point further supporting the data session, the fourth wireless modem being located on the vehicle and employing a fourth electronically steerable beamforming directional antenna having a fourth main beam for establishing the fourth mm wave radio communication link;
a second common network element providing a second single wired connection point for the data session, the second single connection point being common for the third link and the fourth link and the second common network element being arranged to dynamically switch between the third link and the fourth link for the data session, the second common network element being separate to the first common network element and the multipath controller; and wherein
the multipath controller has a second wired port for a second path of the plurality of paths connected to the second single wired connection point; and
the first common network element comprises a first selector selecting between the first link and the second link in response to radio link condition indications for the first link and the second link, the second common network element transmitting a radio condition message to the first common network element, the radio condition message comprising a first radio condition indication for at least one of the third link and the fourth link; and the first selector selects between the first link and the second link in response to the first radio condition indication.

* * * * *